United States Patent [19]
Nishio et al.

[11] Patent Number: 6,038,034
[45] Date of Patent: Mar. 14, 2000

[54] IMAGE PROCESSING APPARATUS AND METHOD THEREFOR

[75] Inventors: Masahiro Nishio, Yamato; Hiroyoshi Takamiya, Yokohama, both of Japan

[73] Assignee: Canon Kabushiki Kaisha, Tokyo, Japan

[21] Appl. No.: 08/528,537

[22] Filed: Sep. 14, 1995

[30] Foreign Application Priority Data

Sep. 19, 1994 [JP] Japan .................................. 6-223204
Feb. 27, 1995 [JP] Japan .................................. 7-038418

[51] Int. Cl.$^7$ .................................................. H04N 1/32
[52] U.S. Cl. ........................ 358/404; 358/444; 358/468
[58] Field of Search .................................. 358/404, 444, 358/401, 408, 296, 442, 468; H04N 1/00, 1/32

[56] References Cited

U.S. PATENT DOCUMENTS

| | | | |
|---|---|---|---|
| 4,731,672 | 3/1988 | Sugishima et al. ...................... | 358/296 |
| 4,899,291 | 2/1990 | Tsukada et al. ......................... | 358/296 |
| 5,125,045 | 6/1992 | Murakami et al. ...................... | 358/456 |
| 5,172,244 | 12/1992 | Nakahara et al. ....................... | 358/401 |
| 5,208,676 | 5/1993 | Inui .......................................... | 358/444 |
| 5,212,566 | 5/1993 | U et al. ................................... | 358/444 |
| 5,309,257 | 5/1994 | Bonino et al. .......................... | 358/504 |
| 5,347,368 | 9/1994 | Mochizuki .............................. | 358/404 |
| 5,375,204 | 12/1994 | Motoyama et al. ..................... | 350/426 |
| 5,377,016 | 12/1994 | Kashiwagi et al. ..................... | 358/468 |
| 5,499,110 | 3/1996 | Hosoghi .................................. | 358/468 |
| 5,726,778 | 3/1998 | Tanio ...................................... | 358/518 |

FOREIGN PATENT DOCUMENTS

0531012A3  3/1993  European Pat. Off. .
3930460A1  3/1990  Germany .

OTHER PUBLICATIONS

Patent Abstracts of Japan, vol. 013, No. 444 (E–828), Oct. 5, 1989 and JP–A–01, 170263 (Canon Inc.) Jul. 5, 1983.

*Primary Examiner*—Kim Yen Vu
*Attorney, Agent, or Firm*—Fitzpatrick, Cella, Harper & Scinto

[57] ABSTRACT

In an image processing apparatus provided with plural output devices, there is achieved efficient image data output without interference of the plural output devices. For this purpose, there are provided input means for entering image data, plural memory means for storing the entered image data, control means for controlling the plural memories respectively corresponding to plural image output devices, and output means for sending the image data from the memories to the plural output devices.

13 Claims, 37 Drawing Sheets

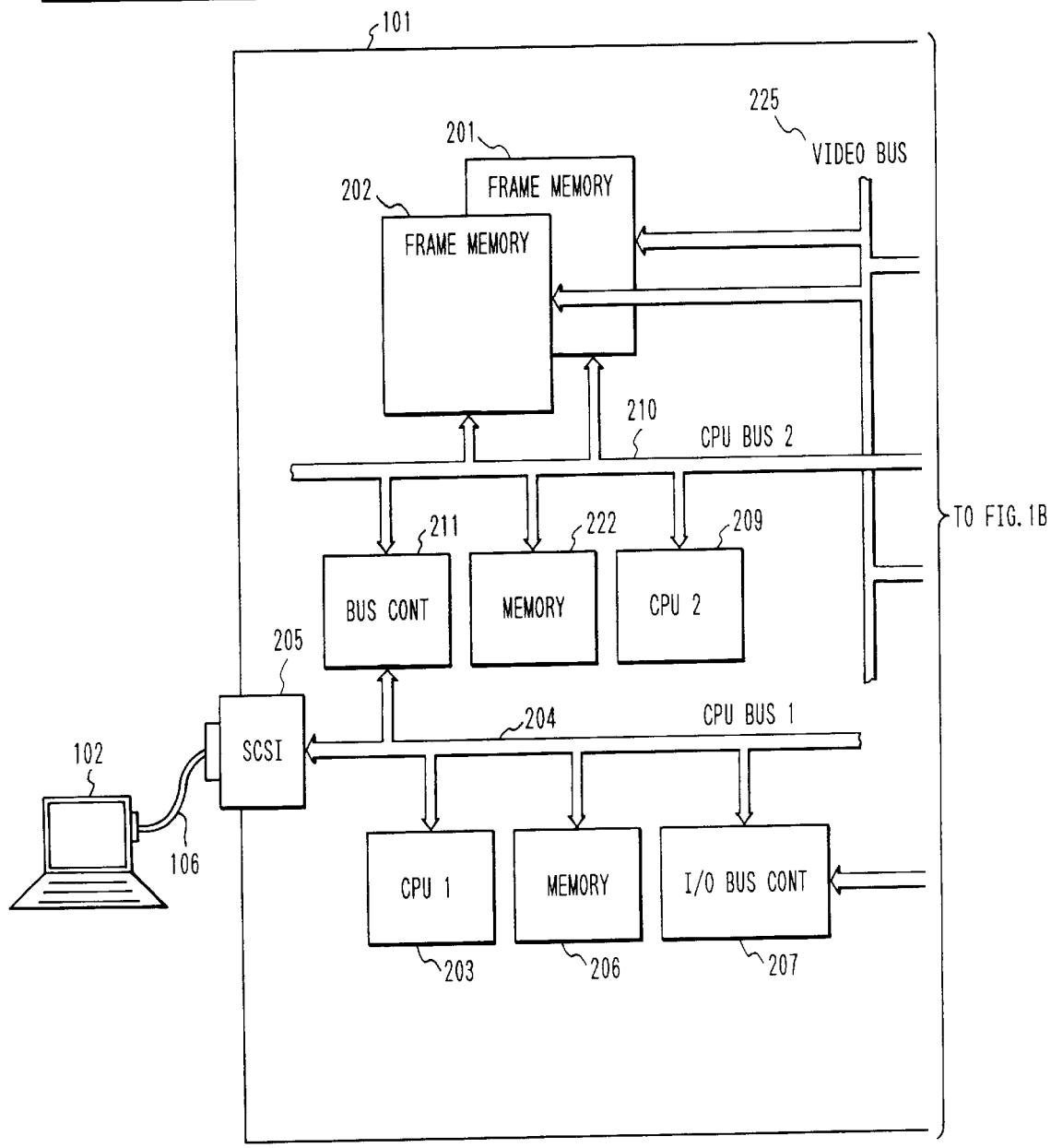

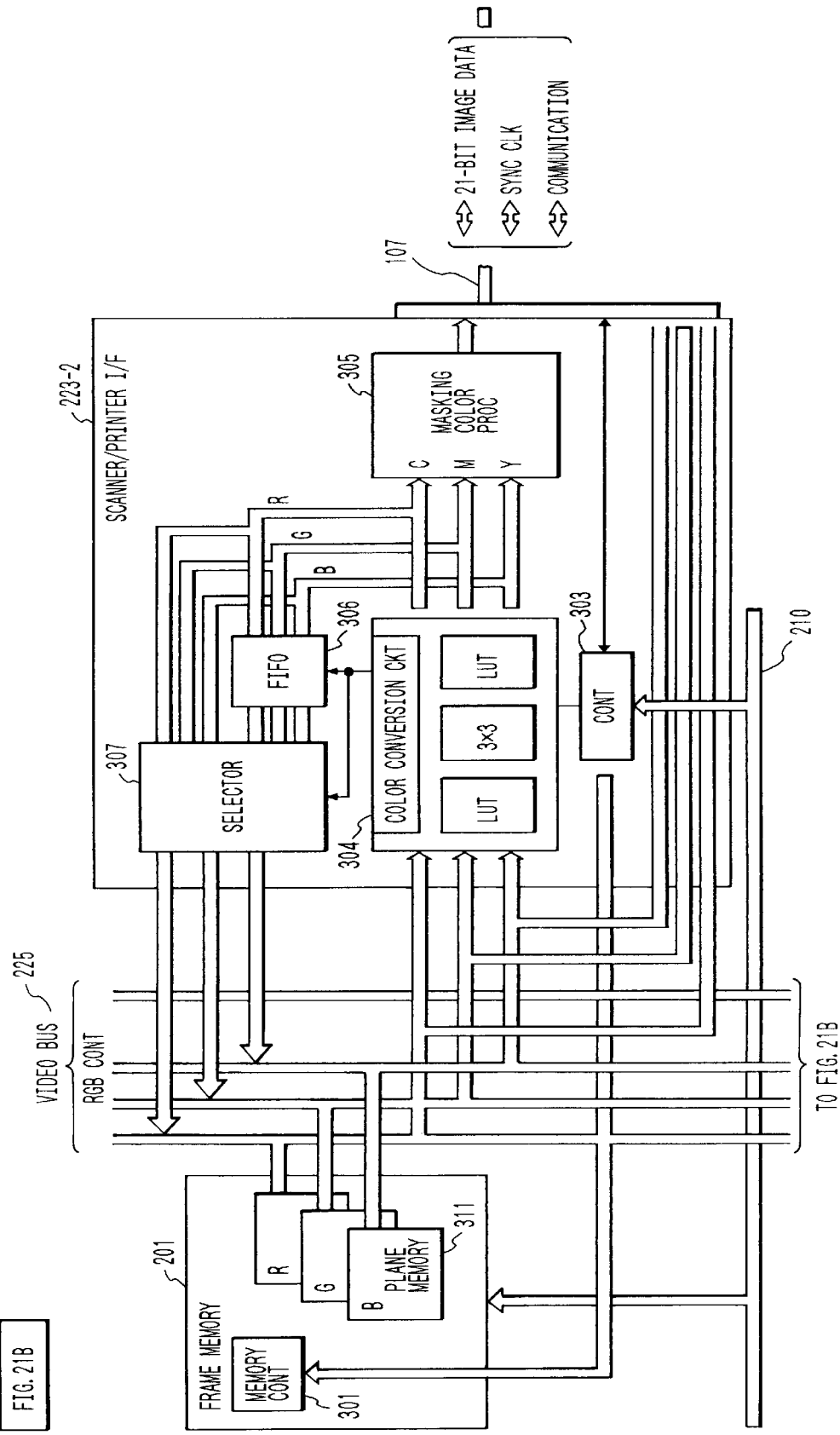

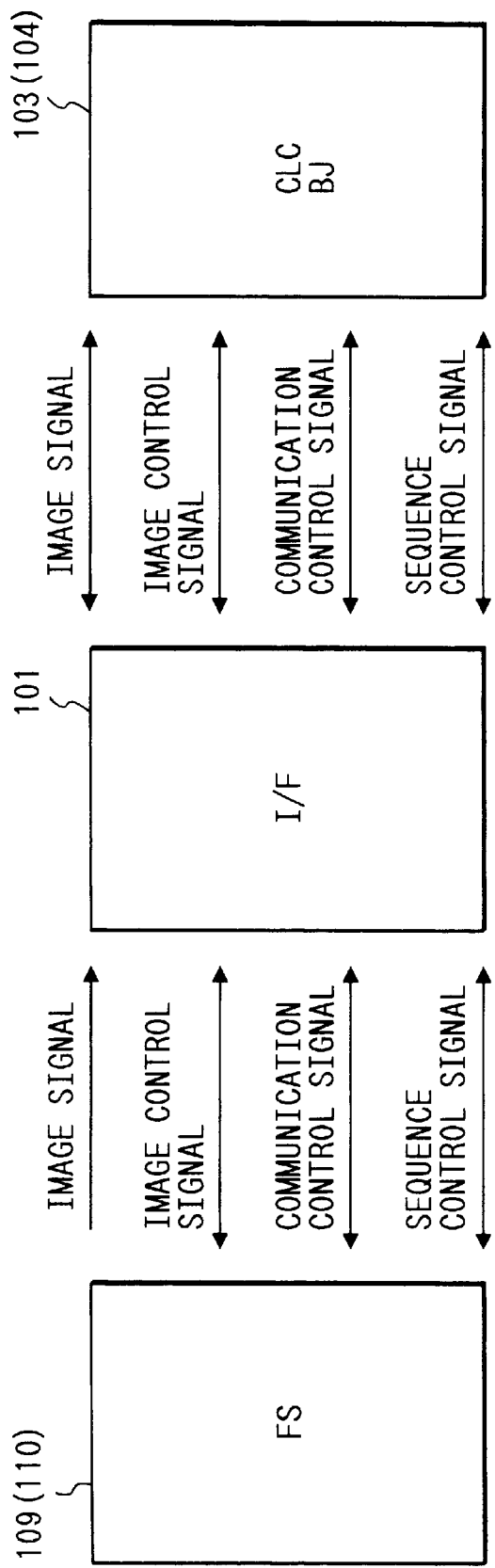

FIG. 28A

■ CONFIGURATION TABLE

| BIT / BYTE | 7 | 6 | 5 | 4 | 3 | 2 | 1 | 0 |
|---|---|---|---|---|---|---|---|---|
| 0 | | | SLOT 0 | ENGINE CARD 0 CODE | | | | |
| 1 | | | SLOT 1 | ENGINE CARD 1 CODE | | | | |
| 2 | | | SLOT 0 | DEVICE CODE | | | | |
| 3 | | | SLOT 1 | DEVICE CODE | | | | |

FIG. 28B

■ ENGINE CARD

| ENGINE CARD NAME | ENGINE CARD CODE |
|---|---|
| CLC | 00H |
| BJ | 40H |
| ENGINE CARD UNMOUNTED | FFH |

FIG. 28C

■ DEVICE CODE

| DEVICE NAME | DEVICE CODE |
|---|---|
| CLC 1 | 00H |
| CLC 2 | 01H |
| BJ | 04H |
| DEVICE UNMOUNTED/ POWER OFF | FFH |

FIG. 28D

| BYTE\BIT | 7 | 6 | 5 | 4 | 3 | 2 | 1 | 0 |
|---|---|---|---|---|---|---|---|---|
| 0 | | | SLOT 0 | | FILM DEVICE CODE | | | |
| 1 | | | SLOT 1 | | FILM DEVICE CODE | | | |

FIG. 28E

■ FILM SCANNER DEVICE CODE

| FILM DEVICE NAME | FILM DEVICE CODE |
|---|---|
| FS 1 | 00H |
| DEVICE UNMOUNTED/ POWER OFF | FFH |

FIG. 29

| BYTE \ BIT | 7 | 6 | 5 | 4 | 3 | 2 | 1 | 0 |
|---|---|---|---|---|---|---|---|---|
| 1 | | | 1ST STAGE CASSETTE INFORMATION | | | | | |
| 2 | | | 2ND STAGE CASSETTE INFORMATION | | | | | |
| 3 | | | 3RD STAGE CASSETTE INFORMATION | | | | | |
| 4 | | | 4TH STAGE CASSETTE INFORMATION | | | | | |
| 5 | | | 5TH STAGE CASSETTE INFORMATION | | | | | |
| 7 | | | MANUAL FEED INFORMATION | | | | | |

FIG. 31

CREATE FILE COMMAND

| | 7 | 6 | 5 | 4 | 3 | 2 | 1 | 0 |
|---|---|---|---|---|---|---|---|---|
| 0 | COMMAND CODE (C4H) | | | | | | | |
| 1 | LUN | | | | | | | |
| 2 | FILE ID | | | | | | | |
| 3 | IMAGE TYPE | | | | | | | |
| 4 | MEM CLR | REGIS-TRATION MODE | IMAGE TYPE OPTIONAL CODE | | | | | |
| 5 | MEMORY FRAME DESIGNATION | | | | | | | |
| 6 7 | WIDTH | | | | | | | |
| 8 9 | HEIGHT | | | | | | | |

FIG. 32

FILE INFORMATION

| | 7 | 6 | 5 | 4 | 3 | 2 | 1 | 0 |
|---|---|---|---|---|---|---|---|---|
| 0 | COMMAND CODE (C6H) ||||||||
| 1<br>2 | LIST FILE PARAMETERS LENGTH ||||||||
| 3 | LIST FILE DESCRIPTER BLOCK LENGTH ||||||||
| 4 | RESERVED ||||||||
| 5<br>6<br>7<br>8 | IMAGE MEMORY REMAINING CAPACITY (BYTE) ||||||||
| 9 | FILE ID ||||||||
| 10 | IMAGE TYPE ||||||||
| 11<br>12 | WIDTH (2 BITE) ||||||||
| 13<br>14 | HEIGHT (2 BITE) ||||||||
| 15 | FILE STATUS ||||||||
| 16 | VOLUME NO. (4 BITS) |||| INPUT DEVICE TYPE (4 BITS) ||||
| 17 | RESERVED ||||||||
| 18 | IMAGE TYPE OPTIONAL CODE ||||||||
| 19 | FILE TYPE ||||||||
| 20 | COMPRESSION IMAGE TYPE ||||||||
| 21<br>22<br>23<br>24 | (MSB)<br>COMPRESSED IMAGE SIZE (4 BYTE)<br>(LSB) ||||||||
| 25<br>⋮<br>∗ | HEREINAFTER, FIELDS 6 TO 20 REPEAT ||||||||

FIG. 33

NATIVE COLOR SPACE AUTO CONVERSION PAGE

| | 7 | 6 | 5 | 4 | 3 | 2 | 1 | 0 |
|---|---|---|---|---|---|---|---|---|
| 0 | RESERVED | | | PAGE CODE (2DH) | | | | |
| 1 | PAGE LENGTH (02H) | | | | | | | |
| 2 | AUTOMATIC CONVERSION DESIGNATION | | | | | | | |
| 3 | RESERVED | | | | | | | |

FIG. 34

■ COLOR CONVERSION TABLE IN CASE OF INPUT BY CLC 103

| INPUT DEVICE | REGISTRATION FILE TYPE | LUT-a | 3 × 3 | LUT-b |
|---|---|---|---|---|
| CLC103-RGB | CLC103-RGB | EXPONENT OF a1 | 103 103 MATRIX | INVERSE EXPONENT OF a1 |
| CLC103-RGB | CLC104-RGB | EXPONENT OF a1 | 103 104 MATRIX | INVERSE EXPONENT OF a2 |
| CLC103-RGB | MONITOR-A-RGB | EXPONENT OF a1 | 103 MTRA MATRIX | INVERSE EXPONENT OF a3 |
| CLC103-RGB | MONITOR-B-RGB | EXPONENT OF a1 | 103 MTRB MATRIX | INVERSE EXPONENT OF a4 |
| | | | | |

■ COLOR CONVERSION TABLE IN CASE OF INPUT BY CLC 104

| INPUT DEVICE | REGISTRATION FILE TYPE | LUT-a | 3 × 3 | LUT-b |
|---|---|---|---|---|
| CLC104-RGB | CLC104-RGB | EXPONENT OF a2 | 104 104 MATRIX | INVERSE EXPONENT OF a2 |
| CLC104-RGB | CLC103-RGB | EXPONENT OF a2 | 104 103 MATRIX | INVERSE EXPONENT OF a1 |
| CLC104-RGB | MONITOR-A-RGB | EXPONENT OF a2 | 104 MTRA MATRIX | INVERSE EXPONENT OF a3 |
| CLC104-RGB | MONITOR-B-RGB | EXPONENT OF a2 | 104 MTRB MATRIX | INVERSE EXPONENT OF a4 |
| | | | | |

■ COLOR CONVERSION TABLE IN CASE OF OUTPUT BY CLC 103

| REGISTRATION FILE TYPE | OUTPUT DEVICE | LUT-a | 3 × 3 | LUT-b |
|---|---|---|---|---|
| CLC104-RGB | CLC103-RGB | EXPONENT OF a2 | 104 103 MATRIX | INVERSE EXPONENT OF a1 |
| CLC103-RGB | CLC103-RGB | EXPONENT OF a1 | 103 103 MATRIX | INVERSE EXPONENT OF a1 |
| MONITOR-A-RGB | CLC103-RGB | EXPONENT OF a3 | MTRA 103 MATRIX | INVERSE EXPONENT OF a1 |
| MONITOR-B-RGB | CLC103-RGB | EXPONENT OF a4 | MTRB 103 MATRIX | INVERSE EXPONENT OF a1 |
| | | | | |

■ COLOR CONVERSION TABLE IN CASE OF OUTPUT BY CLC 104

| REGISTRATION FILE TYPE | OUTPUT DEVICE | LUT-a | 3 × 3 | LUT-b |
|---|---|---|---|---|
| CLC104-RGB | CLC104-RGB | EXPONENT OF a2 | 104 104 MATRIX | INVERSE EXPONENT OF a2 |
| CLC103-RGB | CLC104-RGB | EXPONENT OF a1 | 103 104 MATRIX | INVERSE EXPONENT OF a2 |
| MONITOR-A-RGB | CLC104-RGB | EXPONENT OF a3 | MTRA 104 MATRIX | INVERSE EXPONENT OF a2 |
| MONITOR-B-RGB | CLC104-RGB | EXPONENT OF a4 | MTRB 104 MATRIX | INVERSE EXPONENT OF a2 |
| | | | | |

● LIST OF IMAGE TYPE

| IMAGE TYPE | IMAGE TYPE OPTION CODE | IMAGE TYPE |
|---|---|---|
| 0 | 0 | BIT MAP |
| 1 | 1 | RESERVED |
| 2 | 0 | CLC104/103 RGB |
|   | 1 | CLC103 DEVICE RGB |
|   | 2 | CLC104 DEVICE RGB |
|   | 3 | RESERVED |
|   | 4 | MONITOR-A |
|   | 5 | MONITOR-B |

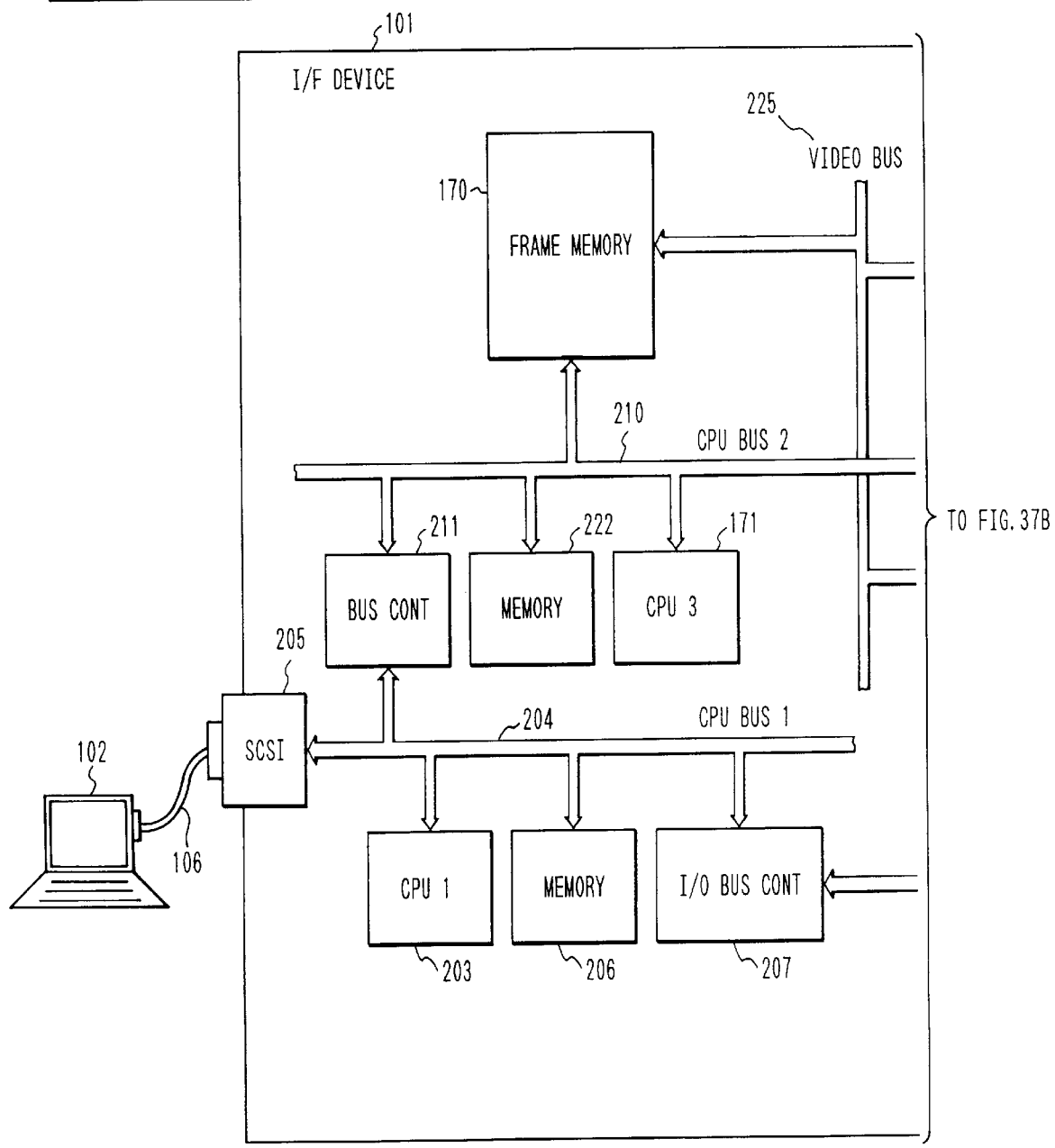

IMAGE PROCESSING APPARATUS AND METHOD THEREFOR

BACKGROUND OF THE INVENTION

1. Field of the Invention

The present invention relates to an image processing apparatus with a memory, and a method for use therein.

2. Related Background Art

Owing to recent commercialization of the digital copying apparatus and development of the interface device for connecting such digital copying apparatus with an external equipment such as a host computer, there is becoming popular a system enabling image input from an image source other than the scanner provided in the digital copying apparatus.

However, such conventional configuration has been associated with the following drawbacks. The above-mentioned interface device is provided with a memory for storing image data transferred from the external equipment and is adapted to execute the printout of the image stored in said memory by the printer of the digital copying apparatus, according to a request from the external equipment, but the transfer of the image data from the external equipment cannot be executed until the completion of the print sequence, so that a significant time has been required in case of printing plural images. Also, in the case of transferring an image from the scanner of the digital copying apparatus to the external equipment, such image data transfer to the external equipment has been inhibited during the execution of the scanner sequence. Consequently, even if the digital copying apparatus is rendered capable of high-speed original scanning such as by an automatic document feeder, the scanned image data stored in the memory of the interface device cannot be transferred to the external equipment, and such point has been an obstacle in constructing the system.

Various digital color copying apparatus have recently been commercialized, and systems have been developed for printout of data such as of a computer graphic image from a host computer by connecting various interface device to such digital color copying apparatus.

In such conventional system, the image processing apparatus has been connected only to an image output apparatus for image formation on a recording medium, such as a digital color copying apparatus.

Such image processing apparatus, connected only to a single image output apparatus, is provided with a frame memory for storing the image data from the host computer. In such configuration, it has been proposed, if the capacity of such frame memory is sufficiently larger than the capacity of the image data to be printed, to divide said memory into two areas and to use one of said areas for image data entry from the host computer during the image data output from the other area to the digital color copying apparatus, thereby achieving image data input and output simultaneously and improving the efficiency of data processing.

Such data transfer method is called double buffer transfer and enables high-speed image data transfer.

However, in case of connecting two digital color copying apparatus of different printout processes, for example those of electrophotographic process and of ink jet process, there may result a difference in the method of utilization of the frame memory. More specifically, in the electrophotographic process, the data of an image are collectively stored, at one time, in the frame memory, whereas, in the ink jet process, the data of an image are stored and released in divided manner, in groups of controlled times, in the frame memory of a smaller size.

The color copying apparatus of electrophotographic process is usually designed with a maximum A3 print size, but that of ink jet process is often designed to print up to A1 size at maximum. The image processing apparatus equipped with such two color copying apparatus will require a frame memory corresponding to the A3 size, but a frame memory corresponding to A1 size is not favorable in consideration of the cost. As shown in FIGS. 1A and 1B, R, G, B full-color signals for the A3 size require a memory capacity of 96 MB. On the other hand, those for the A1 size require a capacity of four times that, or 384 MB. On the other hand, the ink jet recording process can achieve printing of an A1-sized image, by storing image data into the frame memory only for the hatched portion shown in FIG. 36 at each time and by repeating such data storage.

Now, let us consider a case where the image processing apparatus has a frame memory capacity corresponding to A3 size and is provided with a digital color copying apparatus of electrophotographic process and another digital color copying apparatus of ink jet process. In such configuration, if it is desired to print the A4-sized image data only from the digital color copying apparatus of electrophotographic process, high-speed image data transfer is possible by dividing the frame memory into two areas and effecting the double buffer transfer as explained in the foregoing. However if it is desired to effect printing also in the copying apparatus of the ink jet process, proper image output cannot be obtained since the frame memory is fully occupied for the double buffer transfer in the first and second memory areas.

Besides, while the printout of the electrophotographic process can be completed within an extremely short time, that of the ink jet process requires a very long time, thus occupying the frame memory for a long time.

SUMMARY OF THE INVENTION

In consideration of the foregoing, an object of the present invention is to achieve, in an image processing apparatus provided with plural output devices, efficient image data output processes without mutual interference of such processes in said plural output devices.

Another object of the present invention is, in such image processing apparatus, to achieve efficient utilization of storage means, through appropriate use thereof according to the situation of use.

Still another object of the present invention is, in such image processing apparatus, to achieve efficient utilization of a memory area, through appropriate use thereof according to the situation of use.

The foregoing objects can be attained, according to the present invention, by an image processing apparatus comprising:

input means for entering image data;

plural memory means for storing said entered image data;

control means for controlling said plural memory means in respectively corresponding manner to plural image output devices connected to said apparatus; and output means for transferring the image data from said memory means to said corresponding output devices.

According to the present invention, there is provided an image processing apparatus comprising:

input means for entering image data;

first and second memory means for storing said entered image data;

a first mode in which, during image data output from said first memory means to an output device, said second memory means is used for the input of said image data; and a second mode in which said first and second memory means are used respectively corresponding to plural output devices connected to said apparatus.

According to the present invention, there is further provided an image processing apparatus comprising:

control means for controlling a memory area;

a first mode in which said control means divides said memory area in plural areas and effects input and output of the image data in parallel manner; and a second mode in which said control means divides said memory area in plural areas and effects input and output of the image data by causing said divided memory areas to respectively correspond to the output means.

According to the present invention, there is further provided an image processing apparatus comprising:

input means for entering color image data and control information from a host equipment;

memory means for storing said entered color image data; and control means for selecting either a first mode for controlling said memory means as independent plural memory means or a second mode for controlling said memory means single memory means.

Still other objects of the present invention, and the features thereof, will become fully apparent from the following description which is to be taken in conjunction with the attached drawings.

BRIEF DESCRIPTION OF THE DRAWINGS

FIG. 25 is a view showing signal configuration for communication among an I/F device, a color copying apparatus and a film scanner in an embodiment of the present invention;

FIGS. 28A to 28E are views showing storage formats and contents of device information of the color copying apparatus and the film scanner;

FIG. 29 is a view showing the storage format of information on the sheet cassettes;

FIG. 31 is a view showing format and parameters of CREATE FILE command for file preparation;

FIG. 32 is a view showing registered file information;

FIG. 33 is a view showing format of a Native Color Space Auto Conversion PAGE command, for designating auto conversion in the color conversion;

FIG. 34 is a view showing relationship among device type, file type and color conversion table in the color copying apparatus;

DETAILED DESCRIPTION OF THE PREFERRED EMBODIMENTS

Now the present invention will be clarified in detail by the preferred embodiments thereof shown in the attached drawings.

[1st embodiment]

Figure 1B:
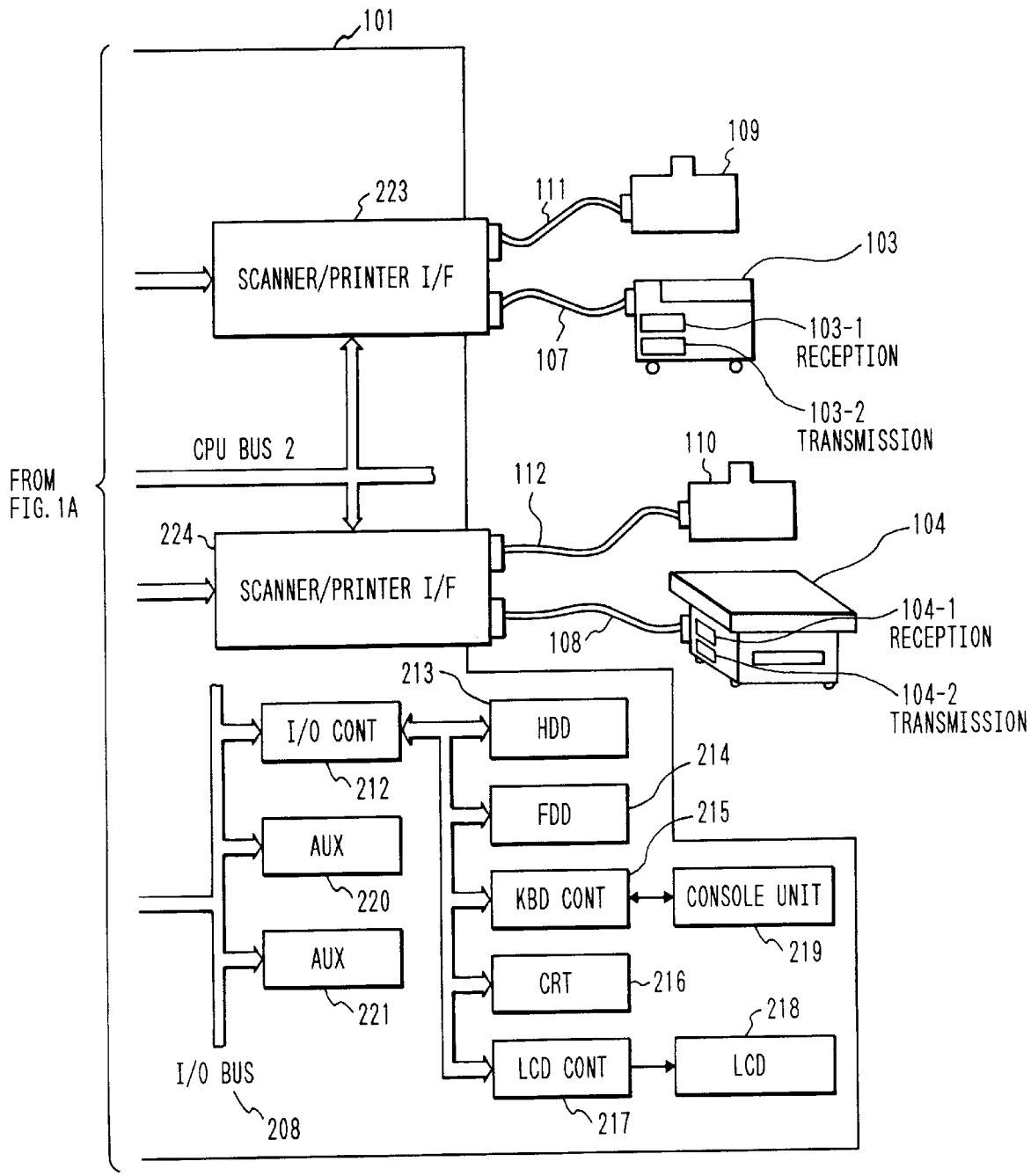
FIG. 1 comprised of FIGS. 1A and 1B is a block diagram of a color image processing system constituting an embodiment of the present invention.

FIGS. 1A and 1B are views schematically showing connections of a system configuration of the present invention.

An interface device 101 constitutes the principal part of the present invention, and is illustrated with schematic internal structure. A host computer 102 is connected, by an interface cable 106 to the I/F device 101, which is a general-purpose interface such as SCSI, whereby computer graphic image data can be transferred from the host computer 102 to frame memories 201, 202 of the I/F device 101 and can be printed by color copying apparatus 103, 104. Also, the entire system can be controlled by the supply of control commands. The digital color copying apparatus 103, 104 are connected by interface cables 107, 108 to the I/F device 101 and are used, as explained above, for printing the images stored in the frame memories 201, 202 of the I/F device 101. It is also possible to store images, read by scanners of the color copying apparatus 103, 104, in the frame memories 201, 202 of the I/F device 101. Also, the entire system can be controlled from operation consoles of the color copying apparatus 103, 104, like the host computer 102. Film scanners 109, 110 are connected to the I/F device 101 through interface cables 111, 112, and images read by such scanners can be stored in the frame memories 201, 202 of the I/F device 101. Instead of said film scanners 109, 110, there may be connected a device for fetching a video image such as of HDTV or other various image-fetching devices, for similarly storing images in the frame memories of the I/F device 101 for image printout. These devices will not be explained further as they are not a principal feature of the present invention.

In the following there will be explained the internal structure of the interface device 101. A first CPU 203 controls I/O's other than the externally connected scanners and printers, as will be explained later. A CPU bus 204 of the CPU 203 is connected to an SCSI controller 205 for interfacing with the host computer 102, a program memory 206 and a bus controller 207 for controlling an I/O bus 208. There is also connected a bus controller 211 for connected with a CPU bus 210 of a second CPU 209, which will be explained later. The I/O bus 208 is connected to an I/O controller 212, which controls a hard disk drive 213, a floppy disk drive 214, a keyboard controller 215, a CRT controller 216, an LCD controller 217, etc. A liquid crystal display device 218 can always display the state of the interface device 101. The keyboard controller 215 is connected to an operation console 219 for varying the initial setting of the interface device 101 or for independent setting of service modes. If necessary there may be externally connected a monitor through the CRT controller 216 or a keyboard through the keyboard controller 215. Furthermore, the I/O bus 208 is provided with auxiliary slots 220, 221 for mounting an interface card such as a CD-ROM, whereby the images stored in the CD-ROM can be developed in the frame memories 201, 202 for printout. Thus the system can match various media such as multimedia in the future.

The second CPU 209 can control the externally connected scanners and printers, and also can effect processing such as rotation or compression of the image stored in the frame memories 201, 202. Into a program memory 222, control programs are loaded, at the start of power supply, from the hard disk drive 213 through the bus controller 211. Said memory 222 is also used in the communication with the CPU 203. The CPU bus 210 is connected to two scanner/printer interfaces 223, 224 for effecting various settings for controlling scanners and printers. An exclusive image bus 225 passes the image data in case of image scanning or printing. The present embodiment uses two scanner/printer interfaces, enabling use of the same frame memory for the printers of different processes, for example an electrophotographic process and an ink jet process. These interfaces are made replaceable according to the process or speed of the copying apparatus to be connected, thereby being adaptable to use in future systems.

Figure 2:
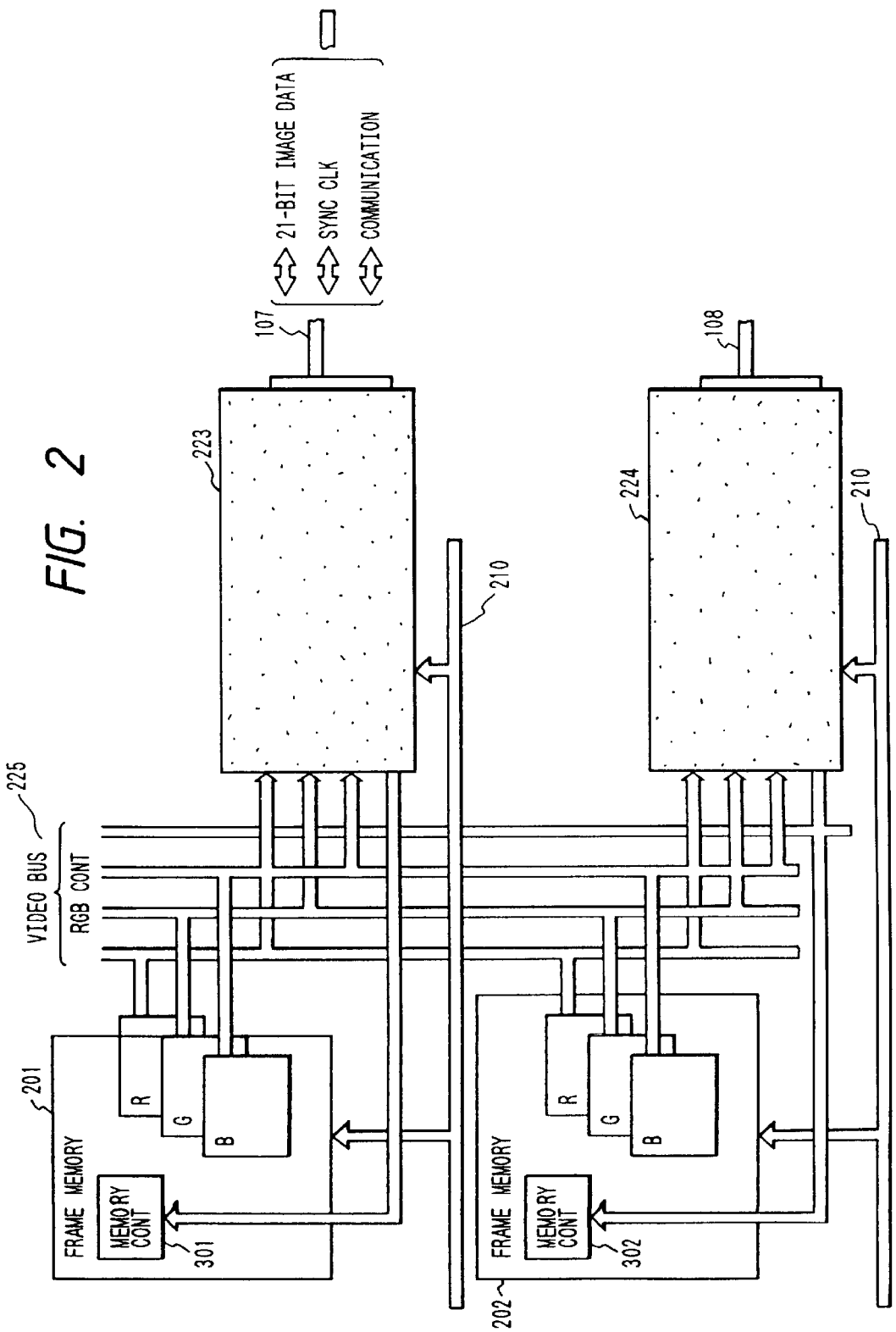
FIG. 2 is a block diagram showing a part of a device 101 in FIGS. 1A and 1B.

FIG. 2 is a view showing the functions of the frame memories 201, 202 and the scanner/printer interfaces 223, 224 at the scanning or printing operation. As shown in FIG. 2, the frame memories 201, 202 are respectively provided with red, green and blue (R, G, B) plane memories, and are subjected to read-out, write-in and reflesh controls by the memory controllers 301, 302. In the present invention, the CPU bus 210 is made independent from video buses 225, so that these two memories can function independently. More specifically, while one of the memories is in a printout operation, the other can effect image transfer from the host computer 102, development of a postscript image or aforementioned image processing utilizing the CPU 209. Such function is called the double buffer function in the present invention.

It is also possible to use these two memories as a single memory space. For example, if each of these memories has a memory capacity corresponding to A4 size, an A3-sized image can be processed by connecting these two memories. Such function is called the single buffer function in the present invention.

The double buffer mode and the single buffer mode are switched between by a command released from the host computer 102 connected through the SCSI controller 205, and these modes are executed according to the control programs stored in the memory 222.

In the following there will be explained the details of the control sequences of the double and single buffer functions.

The interface device 101 of the present invention effects communication with the external equipment 102, for example a host computer, through the SCSI interface 205, and controls the frame memories 201, 202 and the scanner/printer interfaces 223, 224 according to the control programs stored in the memory 222, in response to the following commands released from the external equipment.

(1) Memory mode switching command

This command is used for selecting either of a double buffer mode in which the frame memories 201, 202 are used as independent memories, and a single buffer mode in which said frame memories 201, 202 are used as a single memory.

(2) CREATE command

This command is used for requesting, to the interface device, to secure a memory area in the frame memories 201, 202 for registering image data, and is composed of parameters indicating an image identification number, kind of image, image size and frame designation.

The image identification number is an arbitrary integer from 1 to 128, and an identification number is set for each image. In the present invention, the image data can be registered and stored up to 128 images in the frame memory, and each image in the frame memory is uniquely defined by said image identification numbers.

The present embodiment can handle plural kinds of image, such as RGB 24-bit image, 8-bit pallet image, binary bit map image, etc., and the kind of image is designated by the external equipment by this image kind parameter.

The image size designates the width W and height H of the image to be registered, for example by the number of pixels.

The frame designation parameter is used for designating whether the image data are to be registered in the frame memory 201 or 202 when the double buffer mode is set by the memory mode switching command (1). This command becomes invalid when the single buffer mode is set, as will be explained later.

(3) PUT command

This command is used by the external equipment for informing the interface device of the start of transfer (transmission) of the image data, and is composed of parameters indicating the image identification number and the size of the image data to be transferred.

(4) GET command

This command is used by the external equipment for informing the interface device of the start of transfer (reception) of the image data, and is composed of parameters indicating the image identification number and the size of the image data to be transferred.

(5) PRINT command

This command is used for executing printout of the image data, registered in the frame memory, by the printer unit of the color copying apparatus through the scanner/printer interfaces 223, 224, and is composed of parameters indicating the image identification number, number of prints to be formed and layout information.

The layout information designates, at the image printing on the recording sheet, the coordinate (X, Y) of the upper left corner of the image area, taking the upper left corner of the recording sheet as the original point, and the output image size (W, H). The coordinate values can be designated, for example, in millimeters, inches or pixels, but any unit of designation is converted into the unit of pixels by a software in the interface device.

(6) SCAN command

This command is used for executing scanned input of the original image by the scanner unit of the color copying apparatus, through the scanner/printer interfaces 223, 224, and is composed of parameters indicating the image identification number and the layout information.

The layout information designates the coordinate (X, Y) of the image reading start position on the original table of the scanner, and the input image size (W, H). The coordinate values can be designated, for example, in millimeters, inches or pixels, but any unit of designation is converted into the unit of pixels by a software in the interface device.

(7) Scanner/printer selecting command

As explained in the foregoing, two scanner/printer interfaces 223, 224 can be connected to the interface device of the present invention, and this command designates either of said scanner/printer interfaces for executing the PRINT or SCAN command.

Figure 3:
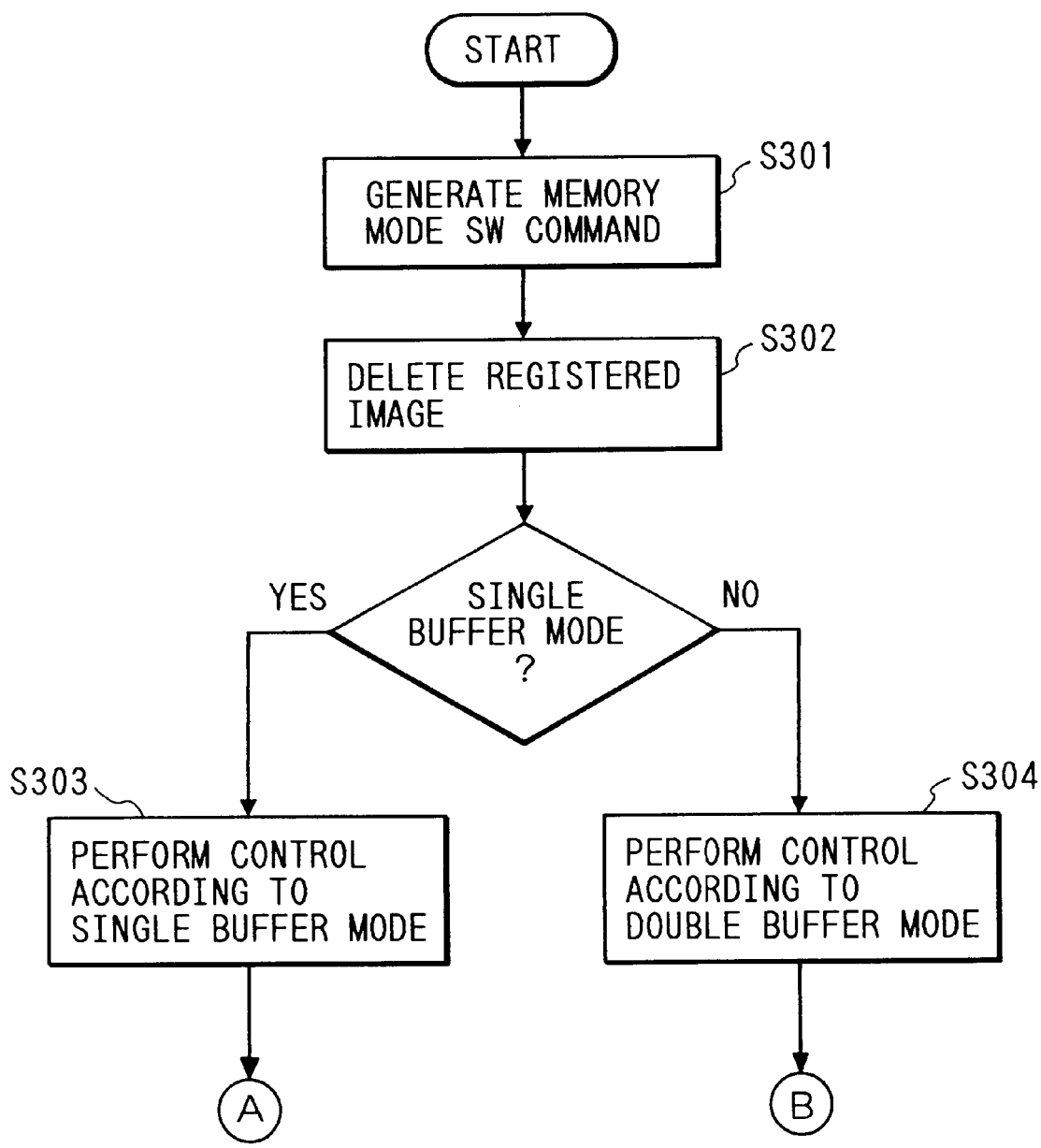
FIG. 3 is a flow chart of a memory card switching sequence.

In the following there will be explained procedure of generation of the above-mentioned commands and control sequence, with reference to a flow chart shown in FIG. 3.

At first the external equipment releases the memory mode switching command, thereby informing the interface device whether the frame memories are to be used in the single buffer mode or in the double buffer mode (S301). Upon reception of said command, the interface device erases the image data already registered in the frame memories (S302), and executes control in thus designated memory mode, according to the command released from the host computer 102 constituting the external equipment (S303, S304).

In the following the control sequence will be explained for each mode.

[Single buffer mode]

Figure 4:
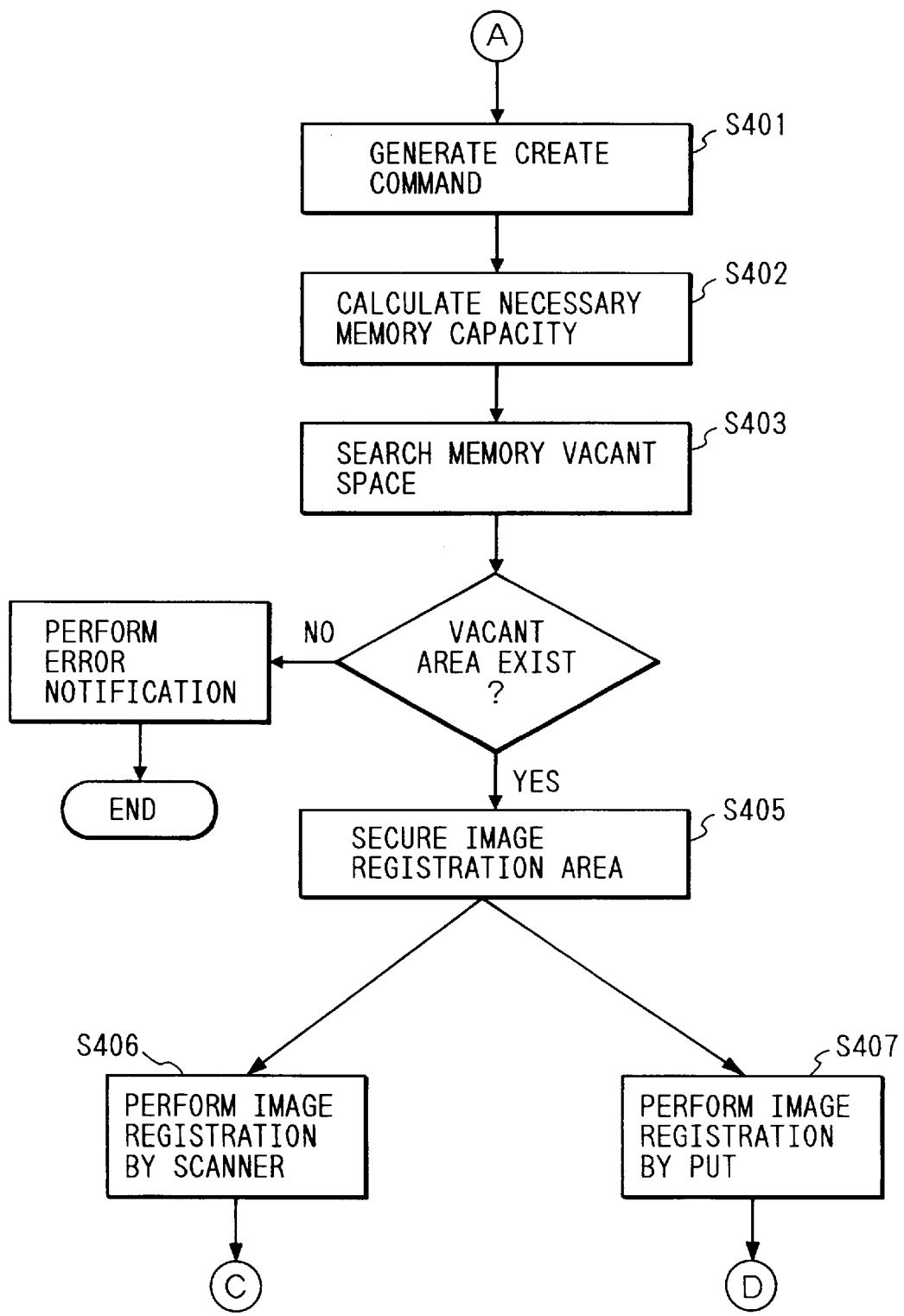
FIG. 4 is a flow chart of single buffer mode control (CREATE control)
Figure 10:
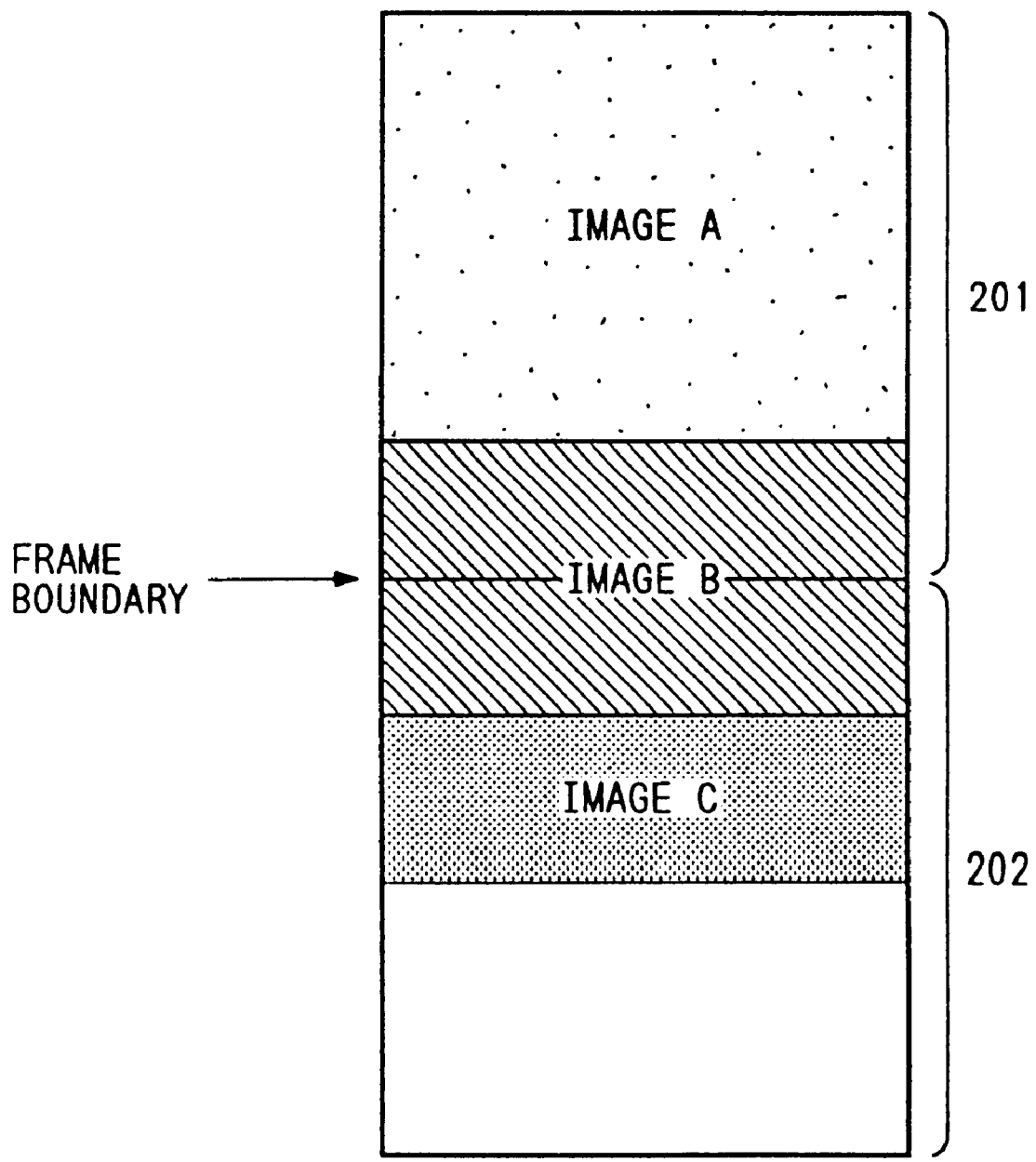
FIG. 10 is a view showing the concept of memory space in the single buffer mode.

FIG. 4 is a flow chart showing the control sequence in the single buffer mode. At first the external equipment releases the CREATE command (S401), requesting the interface device to secure a memory area required for the registration of the image data. In the present embodiment, the frame memory 201 has a capacity of 16 MB for each of R/G/B frames or 48 MB in total, and the frame memory 202 similarly has a capacity of 16 MB for each of R/G/B frames or 48 MB in total. This memory capacity corresponds to the A4 image size with a resolving power of 400 dpi, but, in the case of the single buffer mode, the control program of the interface device controls the address space of the frame memories 201, 202 in logically connected manner, so that the memory capacity becomes equivalent to a frame memory with a capacity of 32 MB for each of the R/G/B frames or 96 MB in total, corresponding to the A3 image size. The interface device calculates the necessary memory capacity from the kind of image and the image size of said command (S402), then searches a vacant area in the R/G/B frames of 32 MB each (S403), and memorized the address information of the vacant area in unique correspondence with the image identification number (S405). In the single buffer mode, the frame designation parameter becomes invalid, and, whether the memory space for image registration is secured in the frame memory 201 or 202 cannot be designated from the external equipment but is determined by a memory management program of the interface device. Therefore, as indicated by an image B in FIG. 10 which shows the concept of the frame memories and the memory space secured therein for image registration, the memory space may be secured over two areas in the frame memories 201, 202. The entire memory space will be used for securing an area corresponding to an A3-sized image. If a vacant area for image registration is not available, an error is informed to the host computer 102.

For registering the image data in the memory area secured by the CREATE command, there may be utilized scanned input (S406) of the original image from the scanner unit of the color copying apparatus through the scanner/printer interfaces 223, 224, or image data transfer (S407) from the external equipment.

Figure 5:
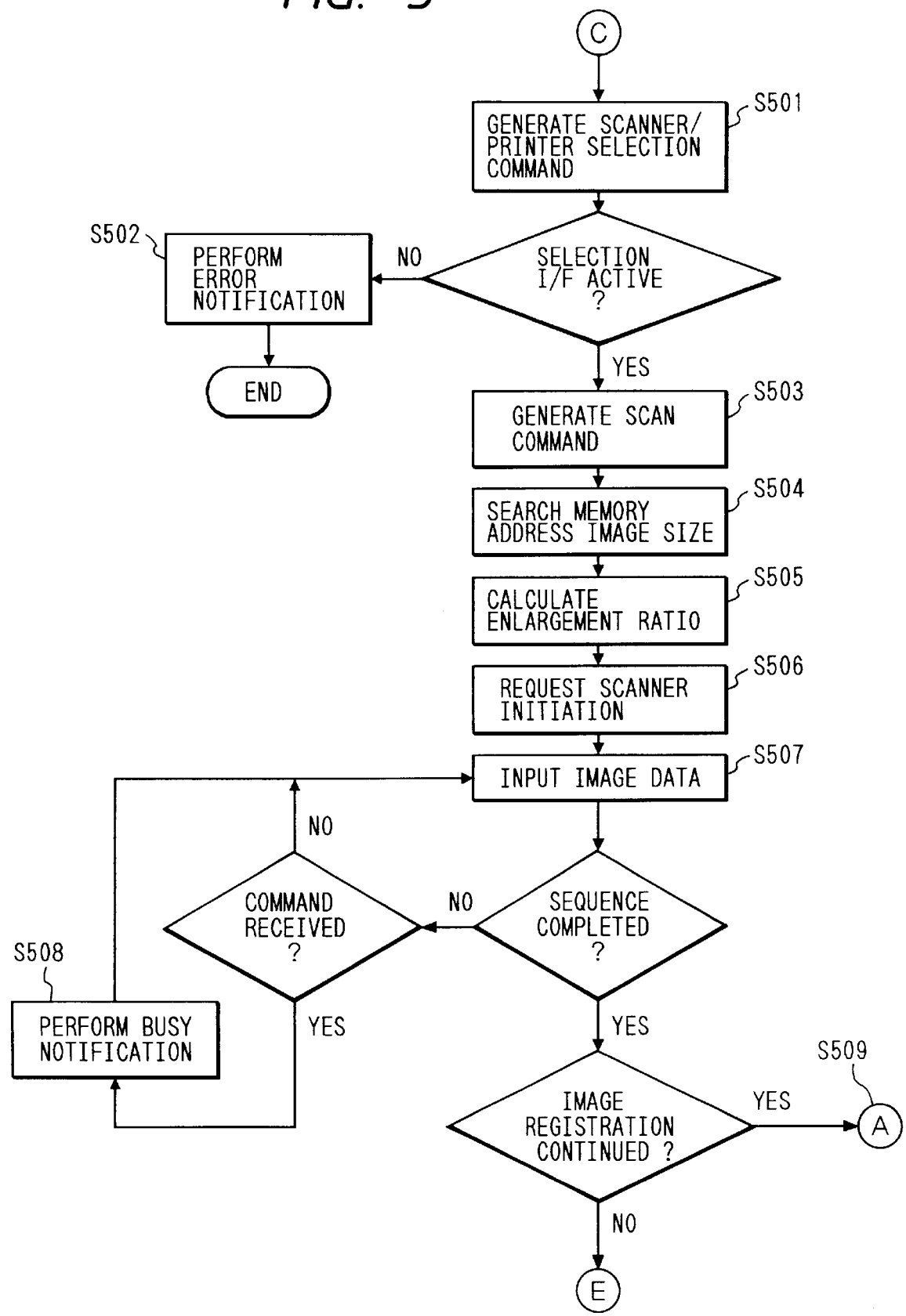
FIG. 5 is a flow chart of single buffer mode control (scan control)

In the case of scanned input of the original image from the scanner unit of the color copying apparatus through the scanner/printer interfaces 223, 224, a scanner/printer selecting command is released (S501 in FIG. 5) to select, for said scanned input, either the color copying apparatus connected to the interface 223 or that connected to the interface 224. If the selected scanner/printer interface is not connected to the interface device, or if the color copying apparatus connected to the selected scanner/printer interface is not in an operable state, the operator is informed of an error (S502).

If the selected color copying apparatus is in the operable state, a SCAN command is released (S503). The control program of the interface device searches the secured memory address and the image size, based on the image identification number designated by said command (S504). It then calculates the enlargement factor, based on said image size and the designated layout information indicating the position of image formation (S505), and requests, through the scanner/printer interface, the color copying apparatus to start the scanner (S506). The RGB data entered from the scanner are supplied through the scanner/printer interface to the video bus 225. The memory controller fetches the image data on the video bus and stores said image data in an address managed by the memory management program (S507).

In the single buffer mode, until notification of the completion of the above-explained scanning sequence is conveyed from the color copying apparatus through the scanner/printer interface, the command request from the external equipment cannot be executed, and a BUSY status is conveyed to the external equipment (S508).

Figure 6:
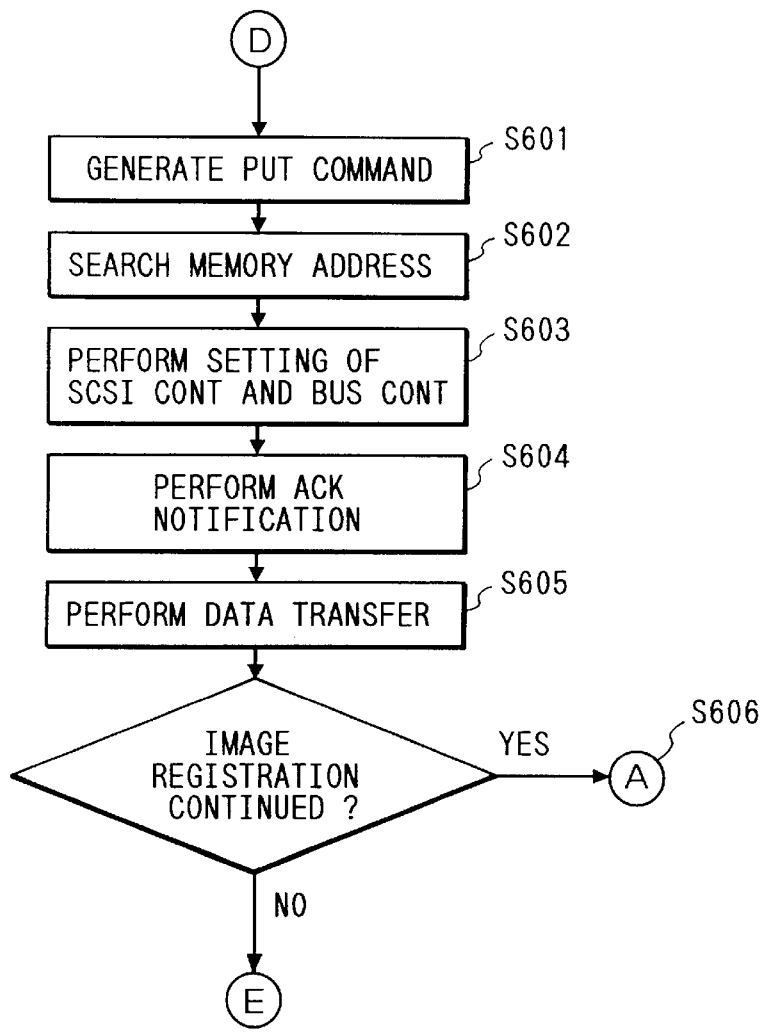
FIG. 6 is a flow chart of single buffer mode control (PUT control)
Figure 7:
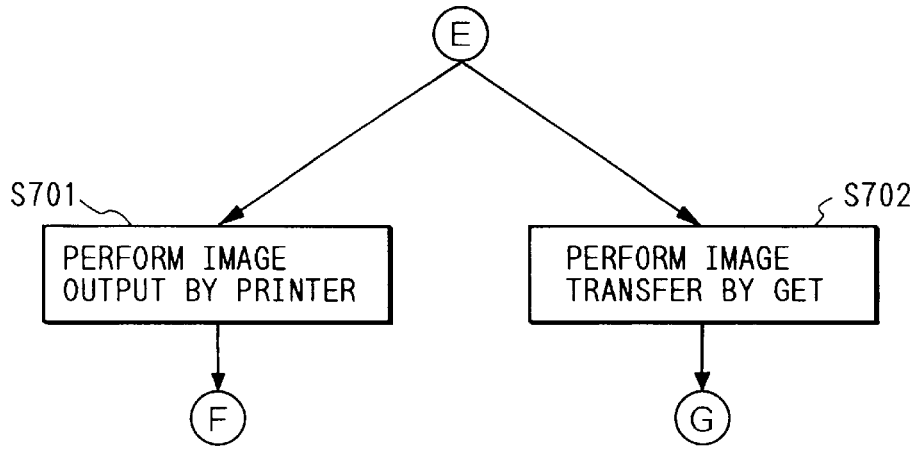
FIG. 7 is a flow chart of single buffer mode control (print/GET control)

On the other hand, in case of transferring the image data held by the external equipment, a PUT command is supplied to the interface device (S601 in FIG. 6). Based on the image identification number designated by said command, the control program of the interface device searches the secured memory address (S602). After setting said address information and the transferred data size in the SCSI controller 205 and the bus controller 211 (S603), it supplies the external equipment with an acknowledgment ACK (S604), in response to which the external equipment starts the data transfer (S605) of a size designated by the PUT command. The image data transferred from the external equipment is DMA transferred, by a DMA controller provided in the SCSI controller 205, to the frame memories 201, 202.

Plural sets of image data are registered in the frame memories by the repetition of the above-explained sequence (S509, S606).

Figure 8:
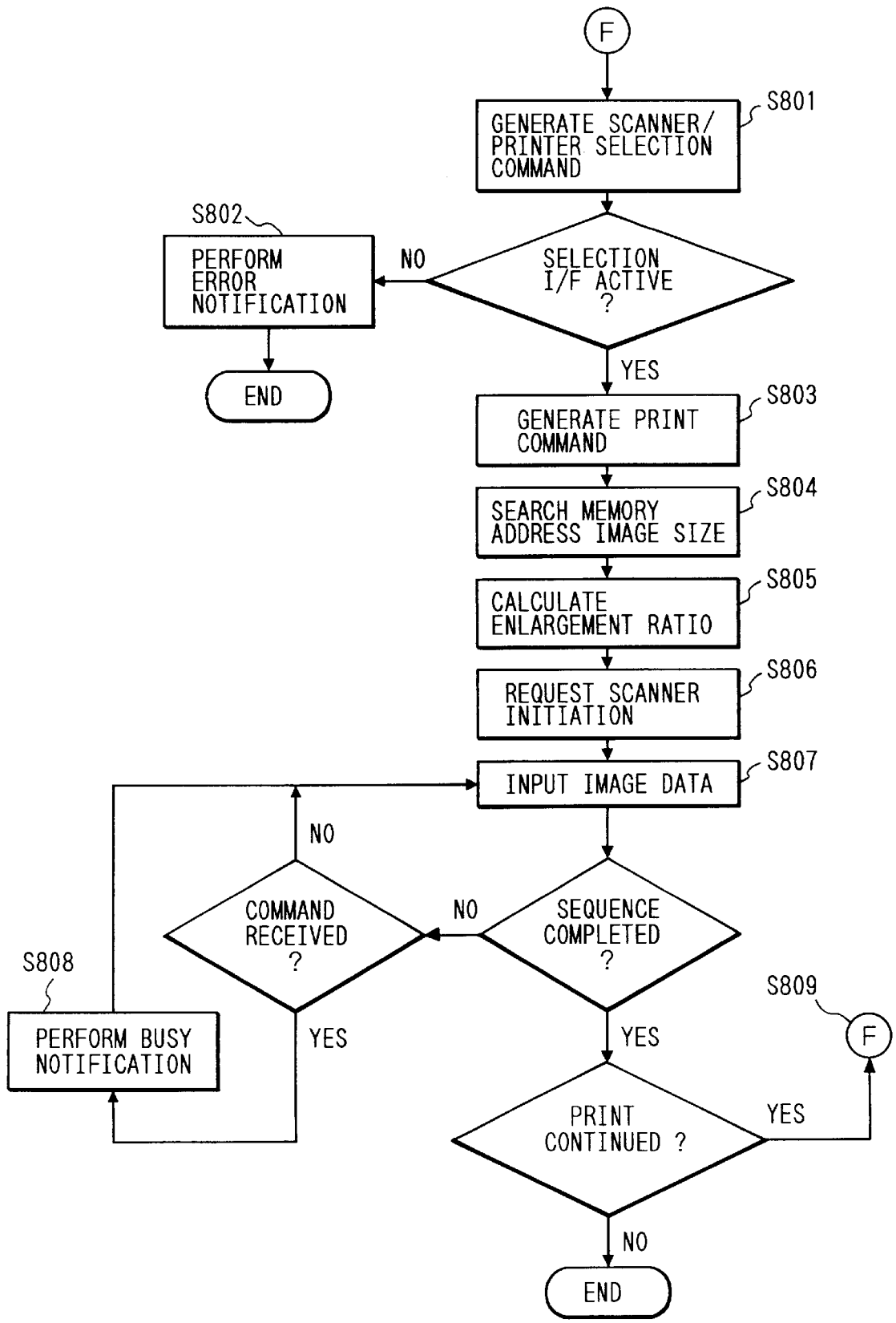
FIG. 8 is a flow chart of single buffer mode control (print control)

In the following there will be explained, with reference to FIG. 8, a case of printing the image data registered in the frame memories, by the printer unit of the color copying apparatus through the scanner/printer interfaces 223, 224 (S701).

At first a scanner/printer selecting command is released (S801) to select the color copying apparatus connected to the interface 223 or that connected to the interface 224, for printout. If the selected scanner/printer interface is not connected to the interface device, or if the color copying apparatus connected to the selected scanner/printer interface is not in an operable state, an error is informed (S802).

If the selected color copying apparatus is in the operable state, a PRINT command is released (S803). The control program of the interface device searches the secured memory address and the image size, based on the image identification number designated by said command (S804). It then calculates the enlargement factor, based on said image size and the layout information (S805), and requests, through the scanner/printer interface, the color copying apparatus to start the printer unit (S806).

In response to said request, the color copying apparatus activates the internal printer thereof, and sends back an image synchronization signal, synchronized with the operation of said printer. In response, the scanner/printer interface sends an image output request to the memory controller, in synchronization with said image synchronization signal. The memory controller releases the image data from the previously searched memory address to the video bus 255 according to said image output request, whereby said image data are printed by the printer (S807). In the single buffer mode, until a notification of the completion of the above-explained printing sequence is conveyed from the color copying apparatus through the scanner/printer interface, the command request from the external equipment cannot be executed, and a BUSY status is conveyed to the external apparatus (S808).

Figure 9:
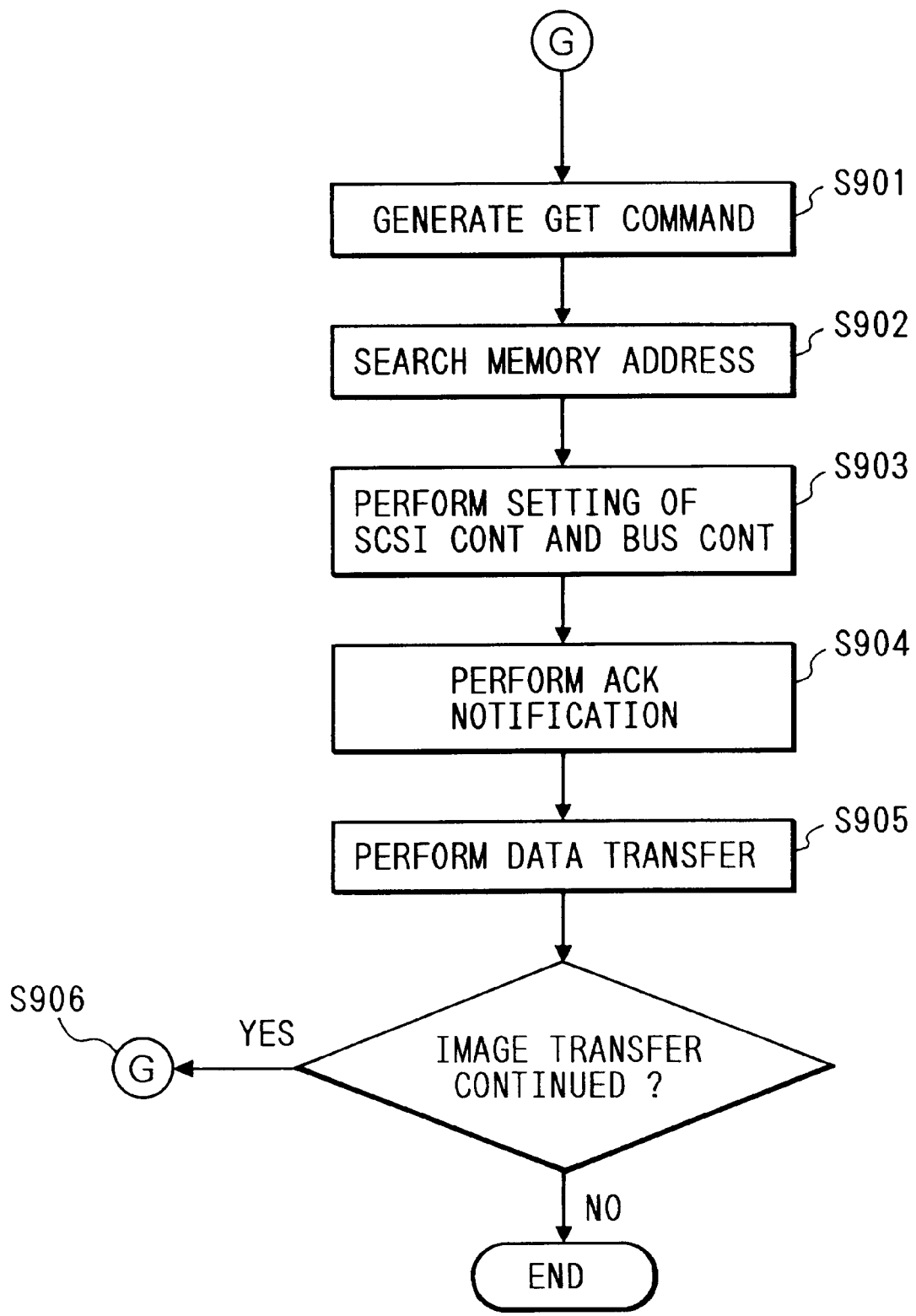
FIG. 9 is a flow chart of single buffer mode control (GET control)

In the following there will be explained, with reference to FIG. 9, a case of transferring the image data, registered in the frame memories, to the external equipment (S702).

At first a GET command is sent to the interface device (S901). The control program of the interface device searches the secured memory address, based on the image identification number designated by said command (S902). After setting said address information and the transferred data size in the SCSI controller 205 and the bus controller 211 (S903), it supplies the external equipment with an acknowledgement ACK (S904), in response to which the external equipment starts the data transfer of a size designated by the GET command (S905). The image data registered in the frame memories 201, 202 are DMA transferred by the DMA controller provided in the SCSI controller 205.

The image data registered in the frame memories are retained therein until an image data erasing command is released from the external equipment or the interface device is reset, so that the PRINT or GET command can be executed repeatedly (S809, S906).

[Double buffer mode]

Figure 11:
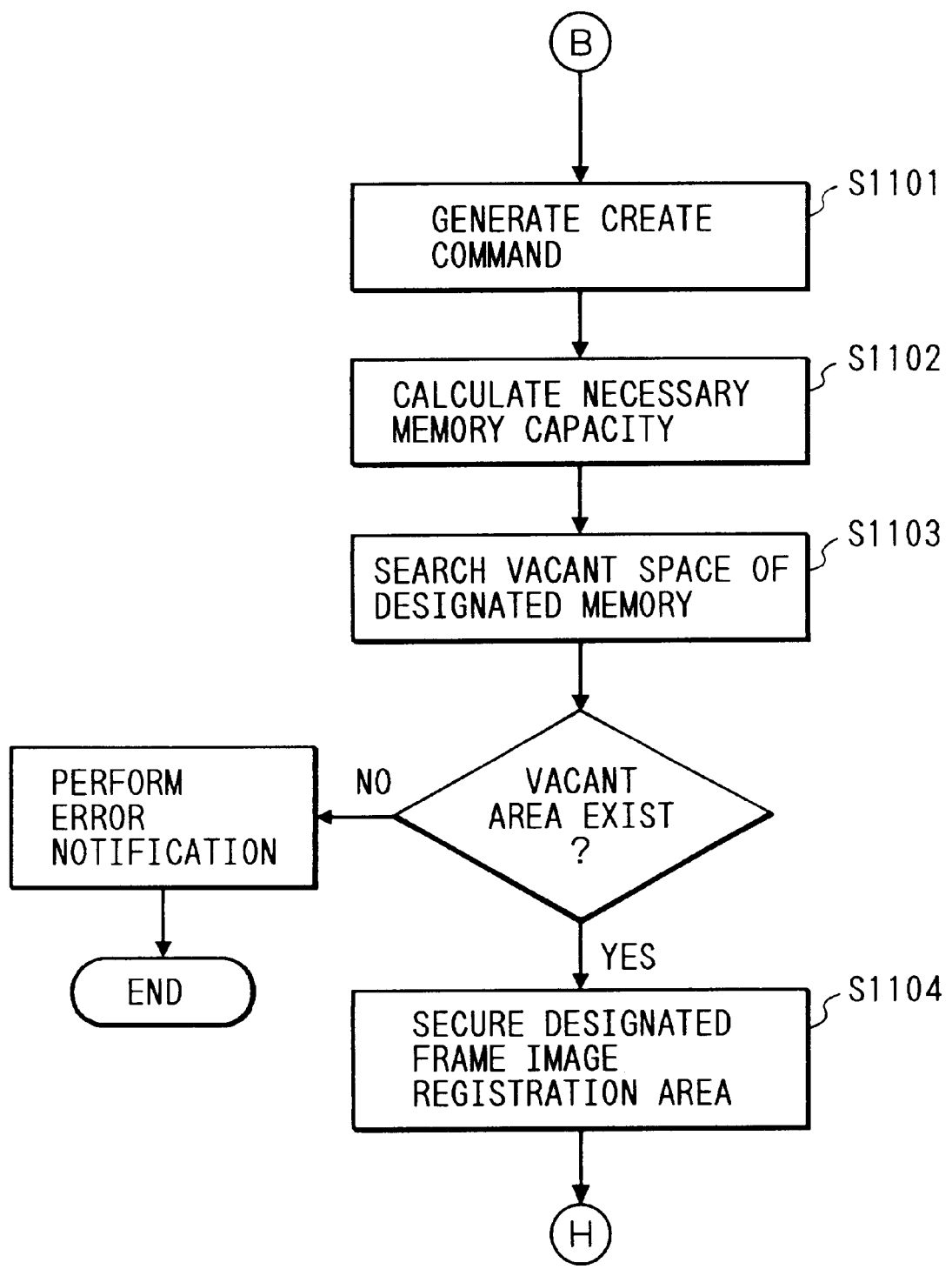
FIG. 11 is a flow chart of double buffer mode control (CREATE control)

In the double buffer mode, the input of the scanned image from the color copying apparatus through the scanner/printer interfaces 223, 224, the image output from the printer, and the image transfer with the host computer 102 (external equipment) are controlled in the same manner as in the single buffer mode explained above. However, in contrast to the single buffer mode in which the command request from the host computer 102 is inhibited during the execution of the scanner or printer sequence of the color copying apparatus, in the double buffer mode, the host computer 102 can effect image data transfer with the frame memory 201 (or 202) while the image is printed from the frame memory 202 (or 201) or while the scanned image is registered in a memory area secured in the frame memory 202 (or 201). Such operation will be explained in detail in the following, with reference to a flow chart in FIG. 11.

Figure 16:
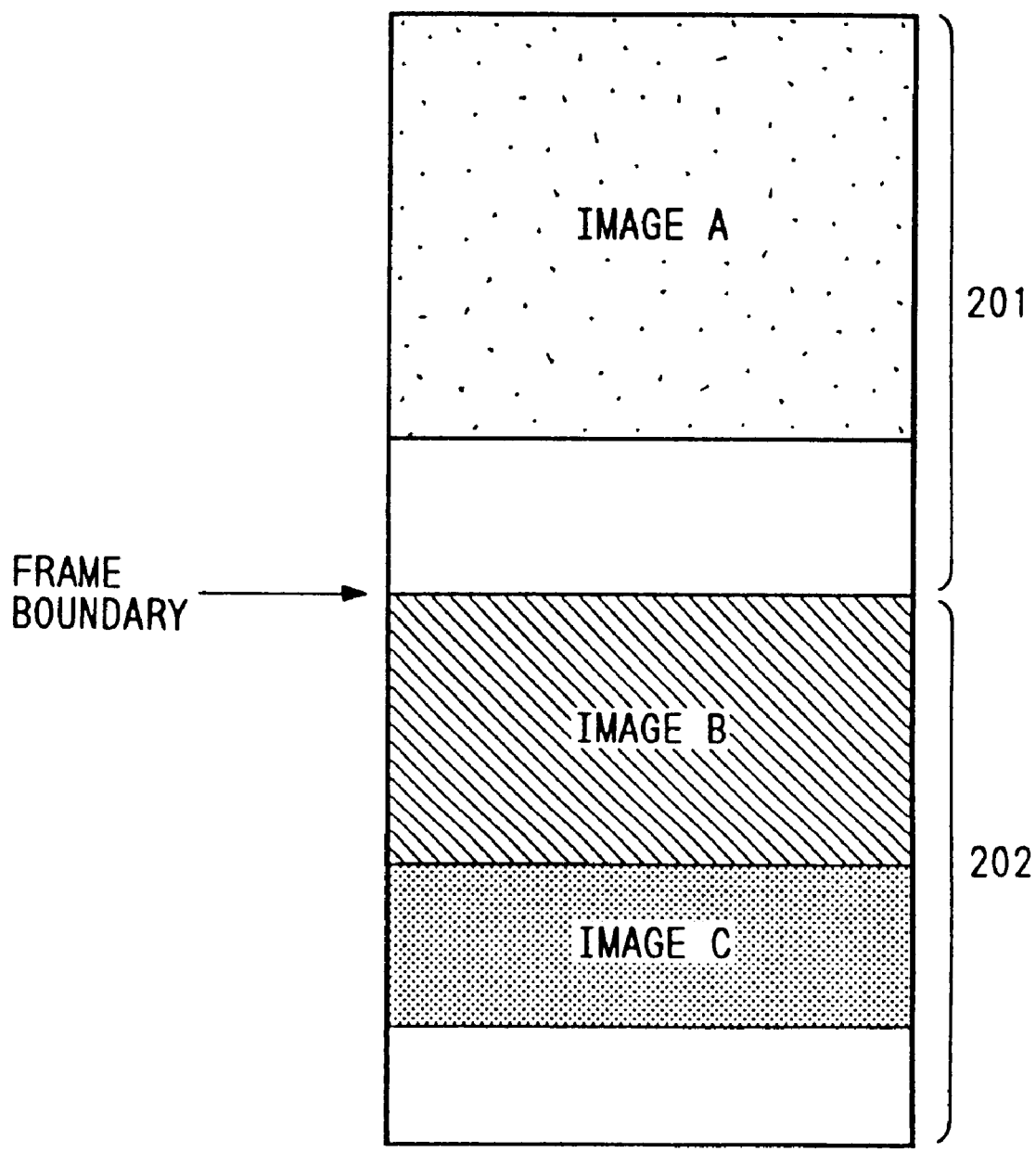
FIG. 16 is a view showing the concept of memory space in the double buffer mode.

At first the external equipment (host computer 102) releases a CREATE command (S1101), thus requesting the interface device to secure a memory area required for image data registration. In the present embodiment, the frame memory 201 has a capacity of 16 MB for each of R/G/B frames or 48 MB in total, and the frame memory 202 similarly has a capacity of 16 MB for each of R/G/B/ frames or 48 MB in total. This memory capacity corresponds to the A4 image size with a resolving power of 400 dpi, but, in the case of the double buffer mode, the control program of the interface device controls the frame memories 201, 202 as independent address spaces, so that the memory capacity becomes equivalent to two frame memories each corresponding to the A4 image size. The interface device calculates the necessary memory capacity from the kind of image and the image size of said command (S1102), then searches a vacant area in the designated frame memory (S1103), and memories the address information of the vacant area in unique correspondence with the image identification number (S1104). In the double buffer mode, the frame designation parameter becomes valid, and the host computer 102 can designate, by said command, whether the memory area is to be secured in the frame memory 201 or in 202. Therefore, as shown in FIG. 16 which shows the concept of the frame memories and the memory space secured therein for image registration, the area of image registration is assigned in either of the memory spaces of the frame memories 201, 202, and is never secured over the frame memories 201, 202 as in the image B in FIG. 10.

Consequently, different from the case of single buffer mode, it is not possible, in the double buffer mode, to secure an image area corresponding to the A3 image size, though the total memory capacity is 96 MB.

Figure 12:
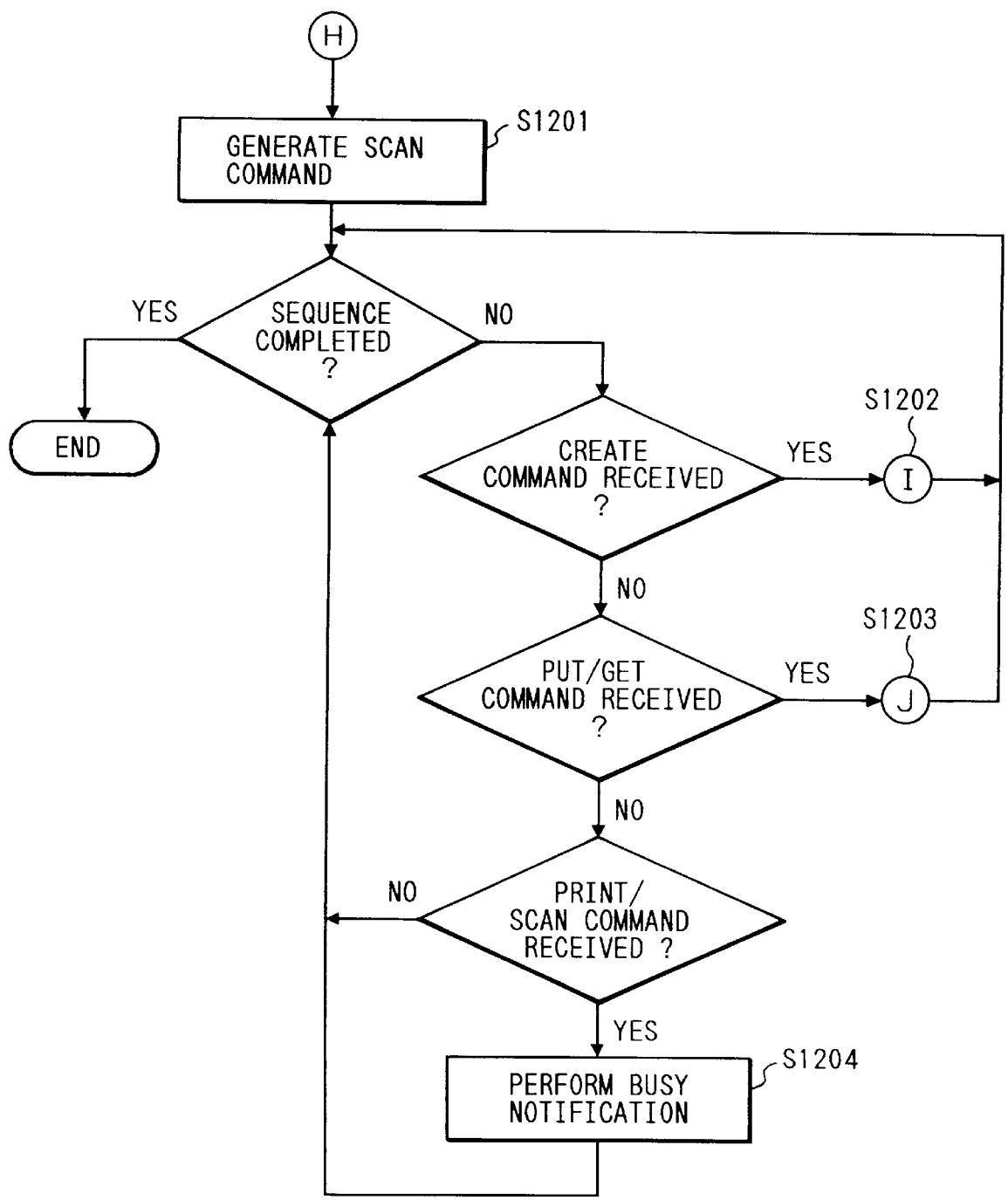
FIG. 12 is a flow chart of double buffer mode control (scan control)
Figure 13:
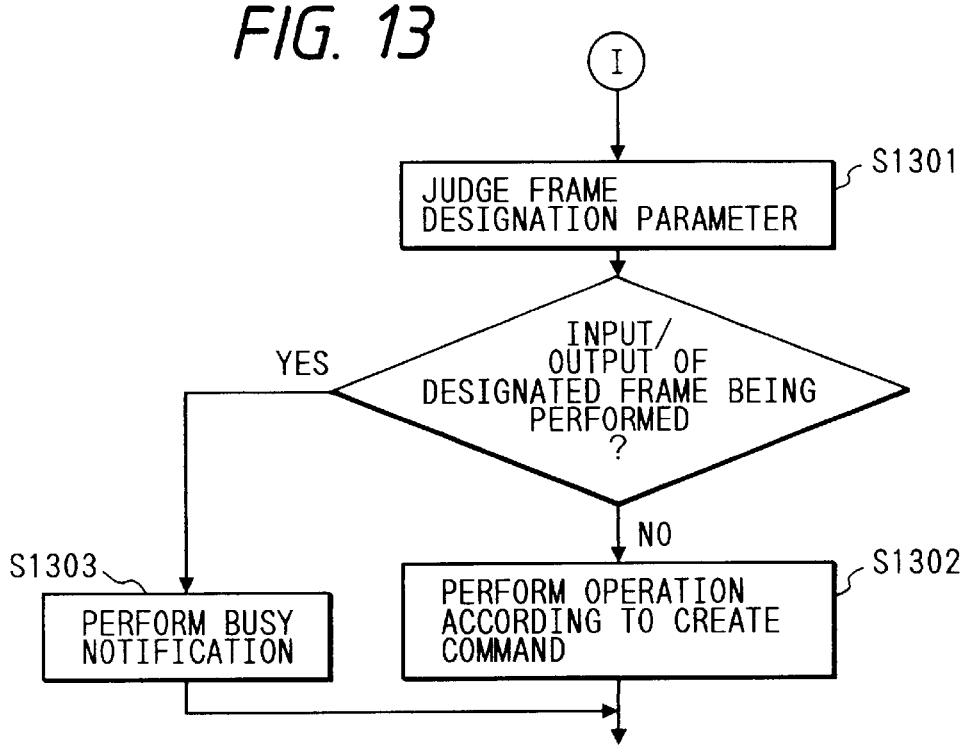
FIG. 13 is a flow chart of CREATE command control in a scan/print sequence in the double buffer mode control.

For registering the image data in the memory area secured by the CREATE command, there may be utilized, as in the case of single buffer mode, scanned input of the original image from the scanner unit of the color copying apparatus through the scanner/printer interfaces 223, 224, or image data transfer from the external equipment (host computer 102), in the same control sequences. However, in the double buffer mode, during the period from the request for scanner start to the color copying apparatus through the scanner/printer interface to the completion of the scanner sequence, there can be executed a command released from the host computer 102, as shown in a flow chart shown in FIG. 12. At the start of the scanner sequence (S1201), the control program of the interface device memorizes whether the image data are entered into the frame memory 201 or 202. FIG. 13 shows the sequence in case a step S1202 receives a CREATE command form the host computer 102 in the course of execution of the scanner sequence. At first the frame designating parameter of said command is identified (S1301), and, if the designated frame does not coincide with the frame under current image data input, the CREATE command is executed for the designated frame, according to the control sequence explained in the foregoing (S1302). If the designated frame coincides with the frame under current image data input, the CREATE command is not executed and a BUSY status is informed to the host computer 102 (S1303).

Figure 14:
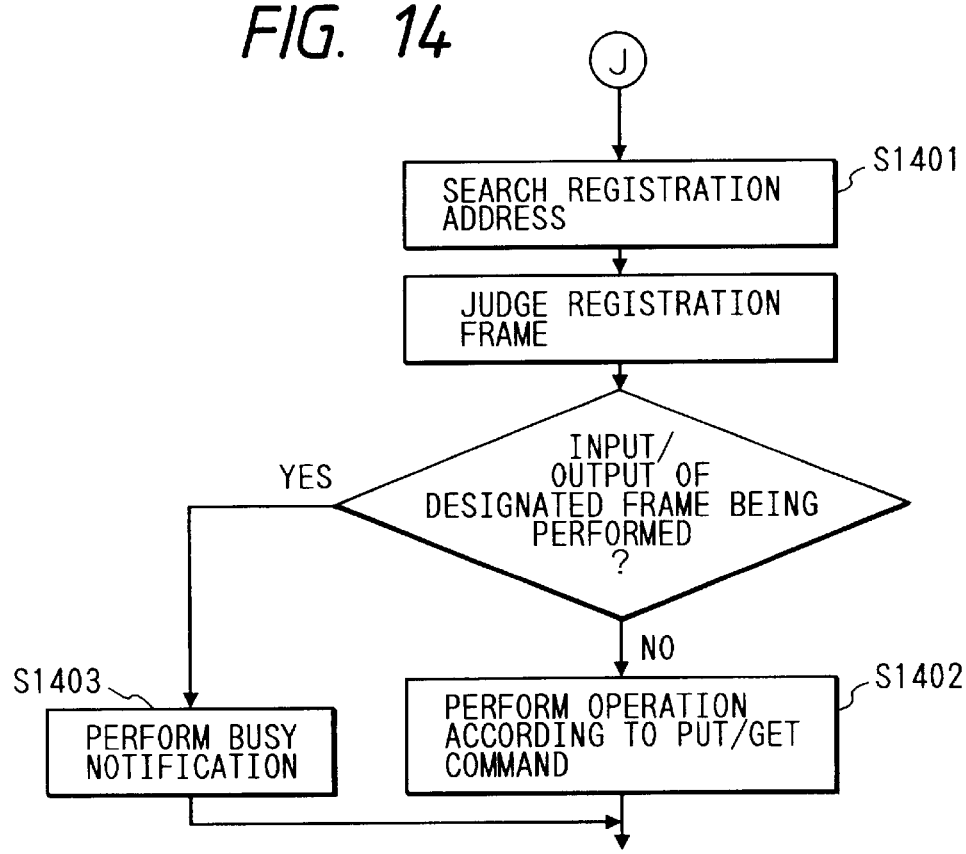
FIG. 14 is a flow chart of PUT/GET command control in a scan/print sequence in the double buffer mode control.

FIG. 14 shows the sequence in case a step S1203 receives a PUT or GET command from the host computer 102 in the course of execution of the scanner sequence. At first the secured memory address is searched, based on the image identification number designated by said command (S1401). If said address does not coincide with the address space of the frame memory under current image data input, the PUT or GET command is executed for the designated frame, according to the control sequence explained before (S1402). If the designated frame coincides with the frame under current image data input, the PUT or GET command is not executed in order to avoid conflict the transmission between the image data input from the scanner and reception of image data with the host computer 102, and a BUSY status is informed thereto (S1403).

In case a PRINT or SCAN command is received from the host computer 102, in a step S1204, in the course of execution of the scanner sequence, a BUSY status is informed thereto.

Figure 15:
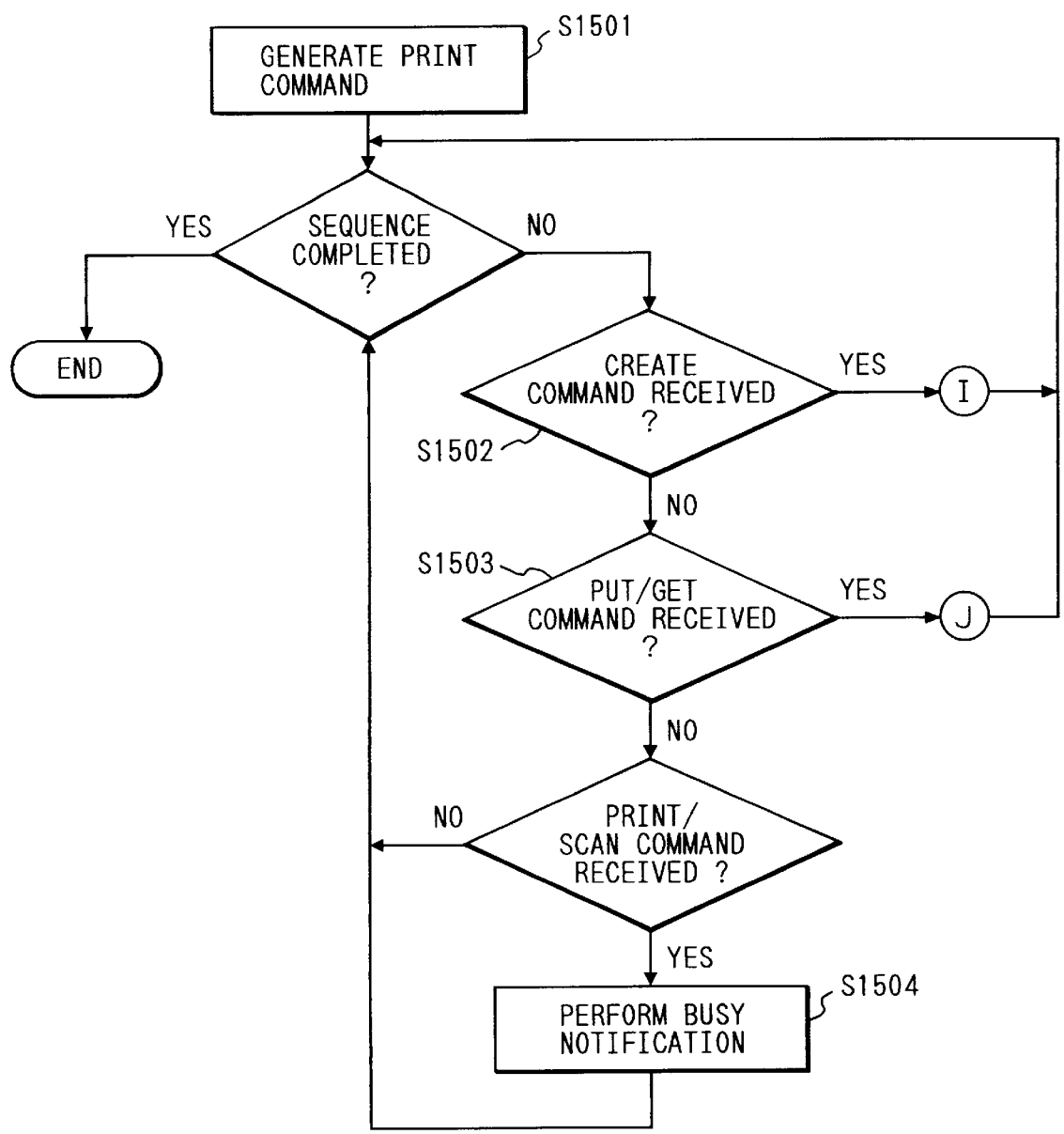
FIG. 15 is a flow chart of double buffer mode control (print control)

The printout of the image data, registered in the frame memories, by the printer of the color copying apparatus through the scanner/printer interfaces 223, 224 can be achieved through a control sequence similar to that in the single buffer mode, but, during the period from the request for printer start to the color copying apparatus through the printer/scanner interface to the completion of the printer operation, there can be executed the command released from the host computer 102, as shown in a flow chart in FIG. 15.

At the start of the printer sequence (S1501), the control program of the interface device memorizes whether the image data are released from the frame memory 201 or 202. FIG. 13 shows the sequence in case a CREATE command is received, in a step S1502, from the host computer 102 in the course of execution of the printer sequence. At first, the frame designating parameter of said command is identified (S1301), and, if the designated frame does not coincide with the frame under current image data output, the CREATE command is executed for the designated frame according to the control sequence explained before (S1302). If the designated frame coincides with the frame under current image data output, the CREATE command is not executed and a BUSY status is conveyed to the host computer 102 (S1303).

FIG. 14 shows the sequence in case a PUT or GET command is received, in a step S1503, from the host computer 102 in the course of execution of the printer sequence. At first, the secured memory address is searched, based on the image identification number designated by said command (S1401). If said address does not coincide with the address space of the frame memory under current image data output, the PUT or GET command is executed for the designated frame, according to the control sequence explained before (S1402). If the designated frame coincides with the frame under current image data output, the PUT or GET command is not executed, in order to avoid conflict between the transmission/reception of the image data with the host computer 102 and the image printout from the printer, and a BUSY status is conveyed to the host computer 102 (S1403).

Figure 17:
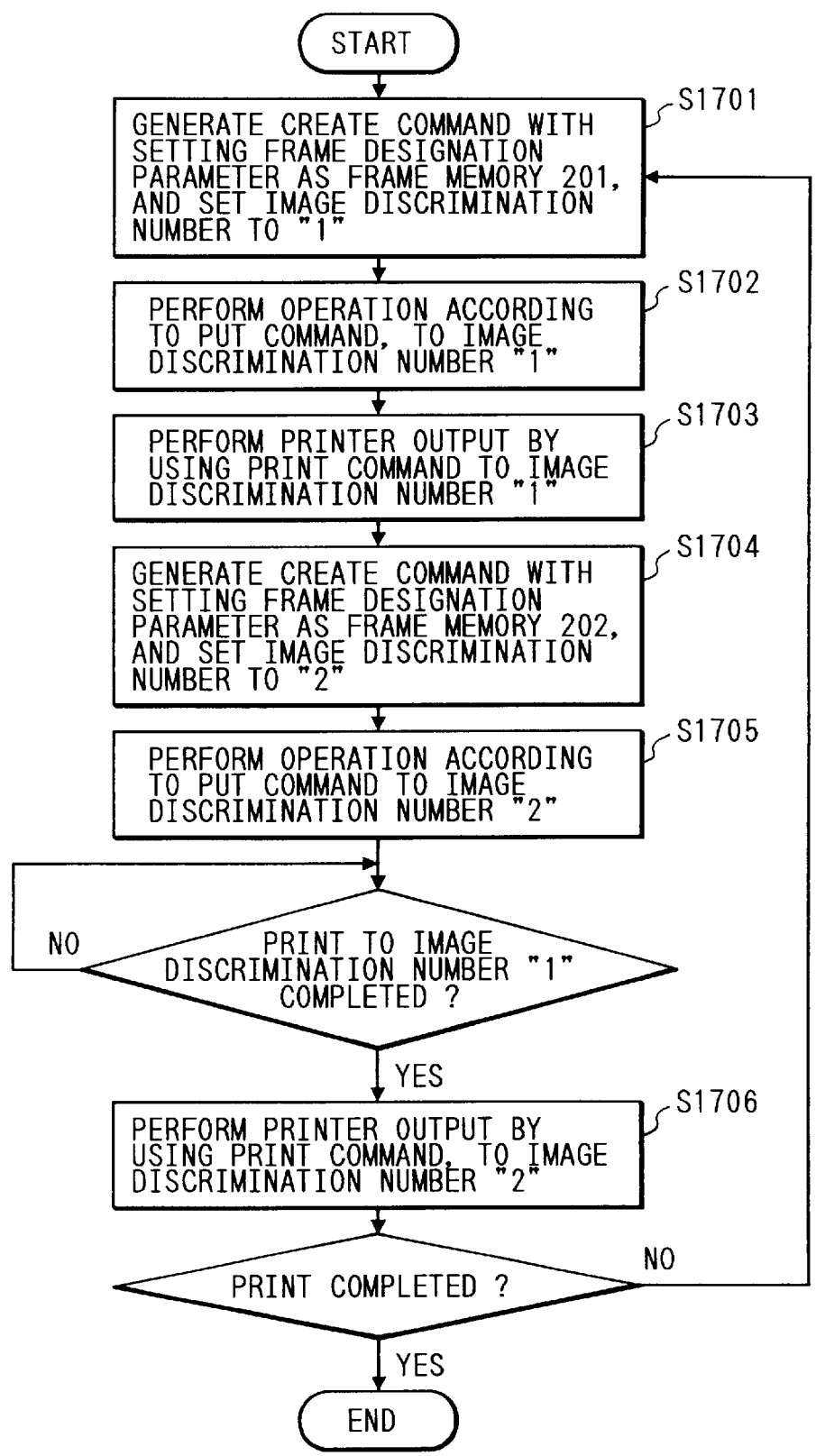
FIG. 17 is a flow chart of a high-speed print sequence in the double buffer mode.

In case a PRINT or SCAN command is received, in a step S1504, from the host computer 102 in the course of execution of the printer sequence, a BUSY status is conveyed thereto. FIG. 17 shows a sequence for high-speed image output with the host computer 102, utilizing the function of the double buffer mode of the present invention. At first a CREATE command is released with the frame memory 201 designated by the frame designating parameter (S1701) to secure a memory space, and an image identification number "1" is assigned thereto. Then a PUT command is executed for said image identification number 1 (step S1702), to transfer and register image data. When this sequence is completed, a PRINT command is released to execute printout of the image data of the image identification number 1 (S1703). During this operation, a CREATE command is released with the frame memory 202 designated by the frame designating parameter (S1704) to secure a memory space, and an image identification number "2" is assigned thereto. Then a PUT command is executed for said image identification number 2 to transfer and register the image data (S1705).

After the completion of the above-mentioned sequence and also after the completion of printout sequence for the image identification number 1, a PRINT command is released to execute printout of the image data of the image identification number 2 (S1706). Thereafter the image registration and the printout execution are repeated similarly for the image identification numbers 1 and 2. As explained in the foregoing, the double buffer mode enables, during the execution of a printer sequence, transfer of the image data to be printed next, whereby the image data contained in the host computer 102 can be printed at a high speed.

[Modification of First embodiment]

The foregoing embodiment employs an SCSI interface for connection with the external equipment, but there may also be employed a parallel communication such as GPIB or Centronix, or a serial communication such as RS-232C.

It is also possible to utilizing a LAN such as Ethernet as the interface with the external equipment, so that the interface device of the present invention may be commonly utilized by plural external equipment such as the host computers.

Also, in the foregoing embodiment the image data transmission/reception between the external equipment and the interface device is achieved in a raster data format, but the single buffer function and the double buffer function of the present invention can be realized also in a configuration where vector data such as a page description language are received from the external equipment and developed into a raster image for printout.

Figure 18:
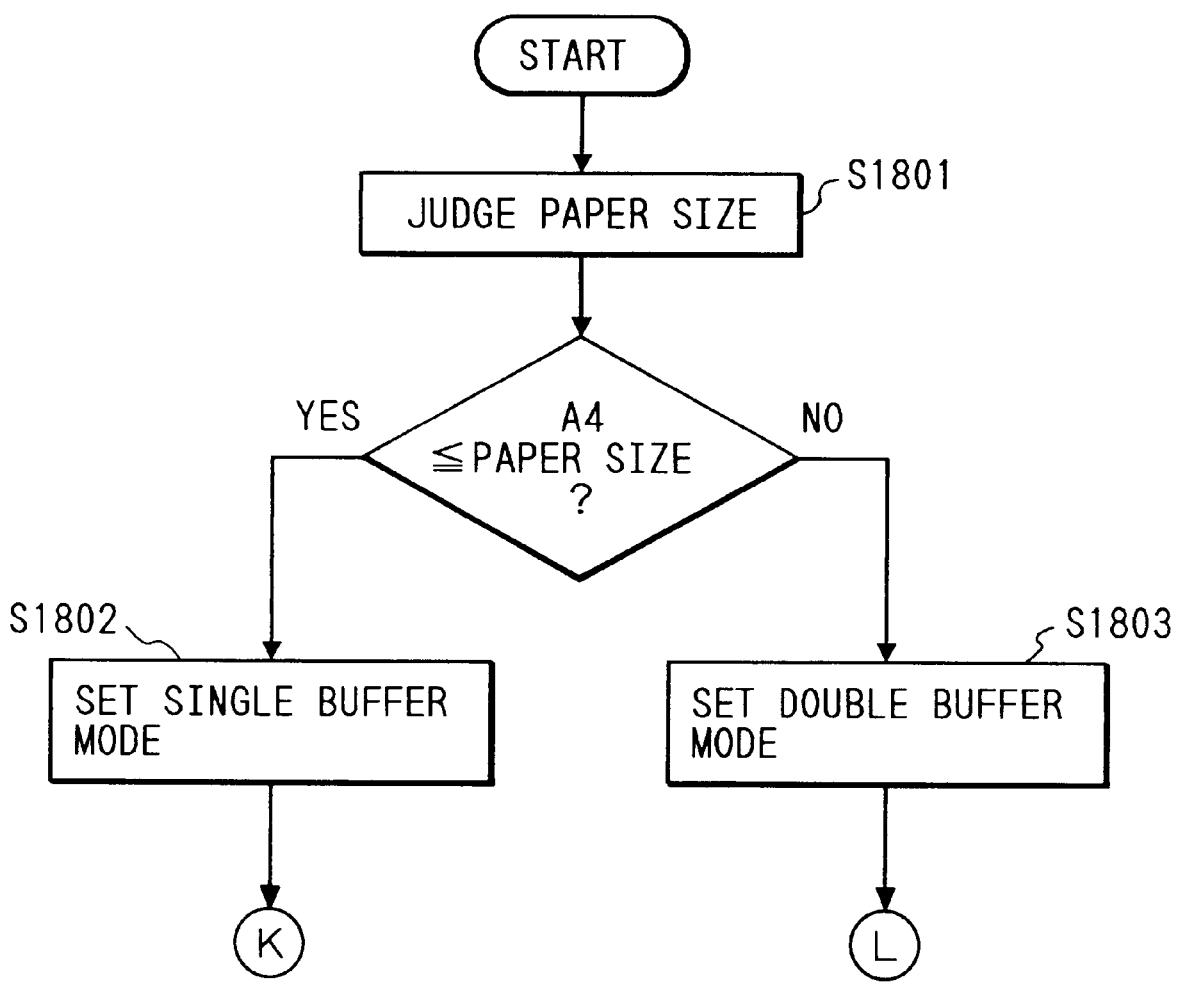
FIG. 18 is a flow chart of a mode switching sequence in PDL development.

FIG. 18 shows the control sequence in case of receiving a page description language from the external equipment. In this sequence, at first the output sheet size is identified (S1801), and, if it is equal to or smaller than A4 size, the control program of the interface device proceeds to the double buffer mode (S1803), or to the single buffer mode (S1802) if the sheet size is larger than A4.

The case of the single buffer mode, the received page description language is interpreted in succession by the CPU 2 (209) (step S1901 in FIG. 19), and is developed into a raster image in a memory space formed by logical connection of the frame memories 201, 202 (S1902). At the completion of data development of a page, there is requested, through the scanner/printer interface to the color copying apparatus, the start of printing of the raster image developed in the frame memories (S1903). At the completion of the printer sequence (S1904), the interpretation of the page description language of a next page is started (S1901) and the raster image is developed in the frame memories. After the completion of the raster image development, the start of printing is requested (S1902, S1903). The output of pages of a designated number is executed by repetition of the above-explained sequence (S1905).

In case of the double buffer mode, the received page description language is interpreted in succession by the CPU 2209 (step S2001 in FIG. 20), and a first page is at first developed into a raster image in the frame memory 201 (S2002). At the completion of the data development of a page, there is requested, through the scanner/printer interface to the color copying apparatus, the start of printing of the raster image developed in the frame memory 201 (S2003). Immediately thereafter started is the interpretation of the page description language corresponding to a 2nd page (S2004), and a raster image is developed in the frame memory 202. The function state of the printer is discriminated at the completion of the image development in the frame memory 202, and, at the completion of printing of the 1st page, there is requested the start of printing of the raster image developed in the frame memory 202 (S2003).

Thereafter the image development and printing are repeated, by developing the odd pages in the frame memory 201 and the even pages in the frame memory 202. In the double buffer mode, the image development of the next page can be executed during the printing operation of the preceding page, so that the present invention is applicable effectively also in the control of the page description language or the like.

In the double buffer mode in the foregoing embodiment, the execution of the PRINT or SCAN command from the external equipment is inhibited in the course of printer or scanner sequence even in case the images to be processed are respectively present in the different frame memories, since the video bus 225 is commonly used by the scanner/printer interfaces 223, 224. However, by providing the scanner/printer interfaces 223, 224 with respectively independent video buses, it is rendered possible to effect the printing or scanning operation by a color copying apparatus even during the printer or scanner sequence by the other color copying apparatus, whereby the image input/output operations can be achieved at a higher speed.

As explained in the foregoing, the first embodiment is provided with means for selecting, according to control information received by the communication means with the external equipment, either a double buffer mode for controlling image data memory means as at least two independent memory means, or a single buffer mode for controlling said image data memory means as single memory means. Thus there can be provided an image processing apparatus capable, in said double buffer mode, of releasing the image data from the 1st memory means for example for printing and simultaneously transferring image data from the host computer to the second memory means, or interpreting the page description language and developing it into a raster image in said second memory, whereby the input/output process of the image data of a large amount can be achieved at a high speed.

Also, the single buffer mode enables input/output of the image data of an amount equal to the maximum capacity of the image data memory means provided in the image processing apparatus. Thus, owing to the above-mentioned control means, the priority on the process speed or on the image size in the image processing apparatus can be arbitrarily selected from the external equipment.

[Second embodiment]

The second embodiment has a mode of effecting double buffer transfer process and another mode in which the frame memories are respectively occupied by the plural output apparatus connected to the image processing apparatus.

As explained in the foregoing, the interface device 101 shown in FIGS. 1A and 1B can be connected to two scanner/printer interfaces, which may be different in the process, for example electrophotographic process and ink jet recording process.

In the following there will be explained, as specific examples, the operations in the electrophotographic process and in the ink jet recording process.

In the electrophotographic process, the data of an image are collectively stored, at one time, in the frame memory, whereas, in the ink jet process, the data of an image are stored and released in divided manner, in plural times, in the frame memory of a smaller size.

Figures 35, 36:
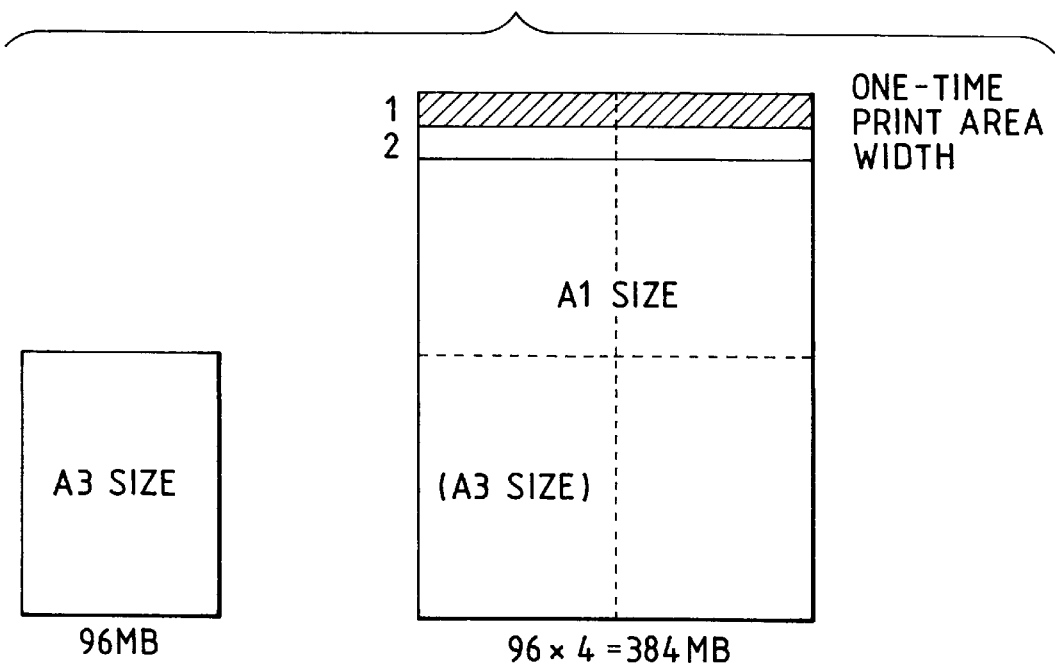
FIG. 35 is a view showing file type codes.
FIG. 36 is a view showing a frame memory size required for the image data size, and the printing method of an ink jet digital color copying apparatus.

More specifically, in the ink jet process, the image data registration in the frame memory is conducted only in a hatched area in FIG. 36, and the printout of the image data of A1 size is achieved by repeating such image data registration.

Consequently, the color copying apparatus of electrophotographic process is usually designed with a maximum A3 print size, but that of ink jet process is often designed to print up to A1 size at maximum.

On the other hand, while the ink jet process requires a very long time for printout, the electrophotographic process can finish printout within a short time.

This interface is so constructed that interface boards thereof can be replaced according to the process or speed of the connected copying apparatus, and can therefore adapt to the future development.

Consequently the system is flexibly adaptable to the connected equipment and is thus expandable.

Also in the present embodiment, two film scanners 109, 110 may be connected, in addition to the scanner/printer units 103, 104, to the scanner/printer interfaces 223, 224. Also the connectable equipment is not limited to the film scanner or the scanner/printer but can be other equipment such as an ink jet printer or a scanner.

Figure 21B:
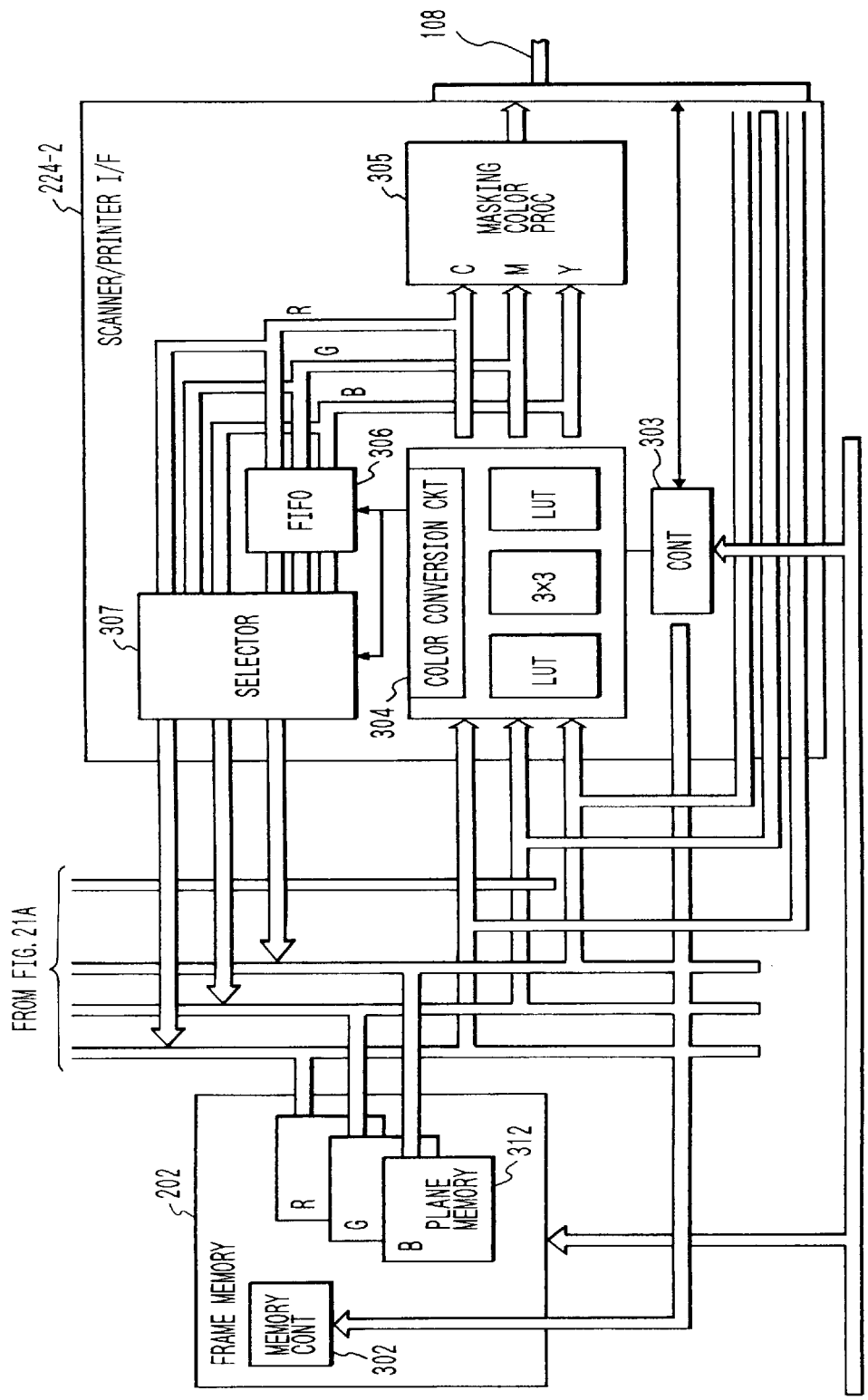
FIG. 21 comprised of FIGS. 21A and 21B is a view showing detailed internal structure of a device 101 in FIGS. 1A and 1B.

FIGS. 21A and 21B are views showing an example of the configuration of scanner/printer interfaces 223-2, 224-2 corresponding to those 223, 224 shown in FIG. 1B and frame memories 201, 202, wherein same components as those in the 1st embodiments are represented by same symbols.

The frame memories 201, 202 have a sam structure and are respectively provided with red (R), green (G) and blue (B) plane memories 311, 312 and controllers 301, 302 therefore. The memory controllers 301, 302 control the read-out and write-in of image data and refreshing of the memories 311, 312.

The frame memories 201, 202 serve to store image data supplied for example from a host computer or the scanner of a digital color copying apparatus. At the image data output, if the capacity of the frame memories is sufficiently large in comparison with the data amount of the output image, there is executed double buffer transfer in which the frame memories 201, 202 are operated in parallel manner.

More specifically, during image data output for printout from one of the frame memories, the other can be used for image transfer from a host computer 102 through a CPU bus 210, development of a postscript image or image processing utilizing the CPU 209 as explained before.

Thus the data processing can be made more efficient by simultaneously effecting the image data output and another process such as image data input.

Consequently a high-speed process can be achieved for example in case of entering plural different images from the host computer 102 and printing these images in succession from the digital color copying apparatus.

However, such double buffer transfer requires both frame memories 201 and 202.

It is now assumed that a digital color copying apparatus of electrophotographic process and a color copying apparatus of ink jet process are connected to the image processing apparatus. In such case, an image data file for the color copying apparatus of ink jet process may be stored in advance in one of the frame memories. In such situation, the above-mentioned double buffer transfer may be used achieving high-speed data transfer in sending the image data of A4 size to the digital color copying apparatus, the above-mentioned image data file stored in advance is overwritten since the double buffer transfer requires two frame memories. Consequently the printout in the ink jet process cannot be conducted properly as the image data are overwritten.

Also, while the printout of the electrophotographic process is completed within a very short time, the printout of the ink jet process requires a very long time, thus occupying the frame memory for a long time.

Consequently, in the present embodiment, the frame memories 201, 202 are respectively occupied by the two digital color copying apparatus under the control of the CPU 2, whereby the mutual interference is avoided.

Also under the control of the CPU 2, the frame memories 201, 202 may be linked as a single memory, whereby, in case each frame memory has a capacity corresponding to the A4 size, such memory linking enables to hangle an image of A3 size.

Thus the apparatus of the present embodiment is provided with a 1st mode for effecting double buffer transfer with two frame memories, a second mode for using the frame memories 201, 202 respectively corresponding to the connected equipment, and a third mode for using the frame memories 201, 202 as a single memory, and is capable of selecting the optimum one from such first to third modes.

The CPU 2 controls these modes by commands set at the image storage in a CREATE FILE shown in FIG. 31.

Thus the user can arbitrarily set these modes according to the purpose.

Also, as the frame memory can be commonly utilized by plural equipment of different processes, it is not necessary to set the frame memory in advance for each of such equipment, and effective utilization of memory can be achieved.

Figure 22:
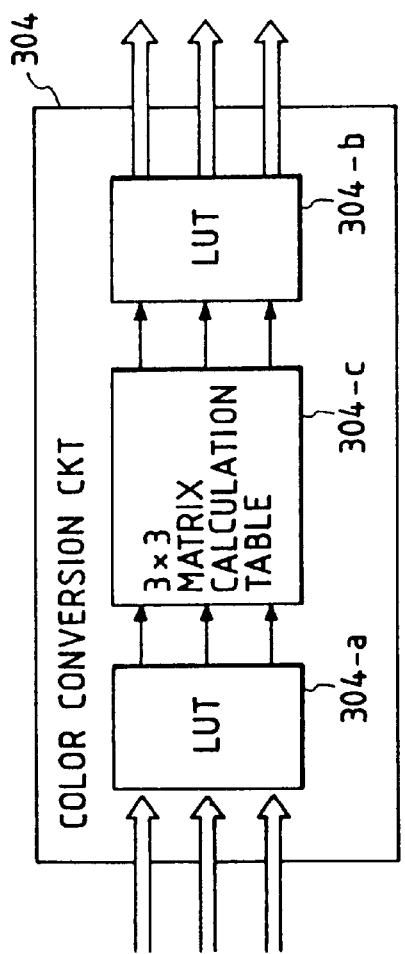
FIG. 22 is a block diagram of an example of the color conversion circuit.

The scanner/printer interfaces 223 and 224 have a same structure, so that same circuits in these interfaces are represented by a same number. A color conversion circuit 304 converts the color space of the input image data into image data of a desired color space. A masking color process circuit 305 effects image editing such as masking, UCR process, etc., for faithful image reproduction in consideration of the color reproduction characteristics of the connected output equipment. A FIFO 306 adjust the write-in timing of the image data into the frame memory, in case of effecting read-out and write-in of the image data on a same frame memory. A selector 307 switches the image data path, according to whether the adjustment of the write-in timing is necessary or not. A controller 303 controls the various circuits mentioned above. FIG. 22 is a block diagram of the color conversion circuit 304.

Figure 24:
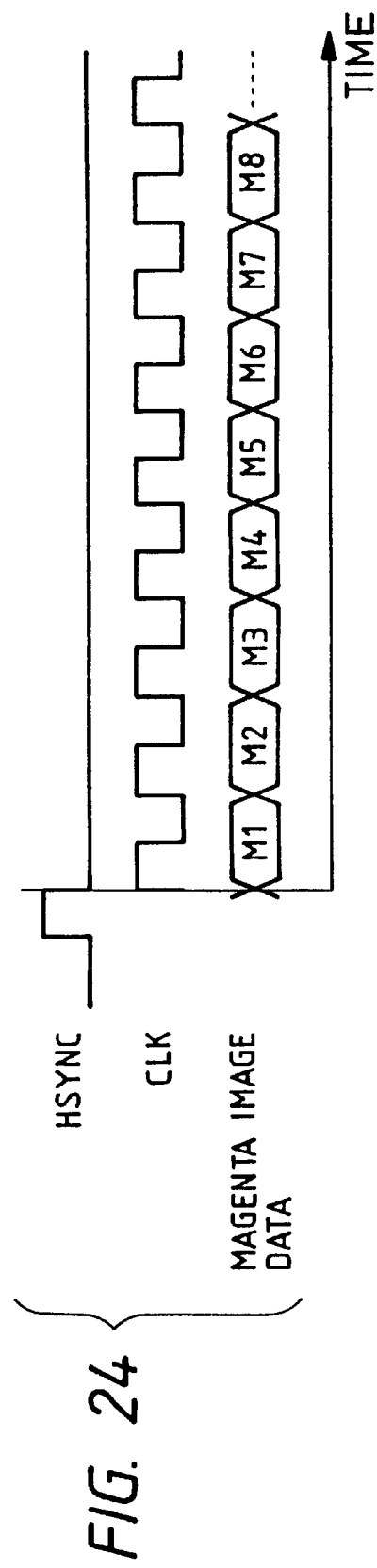
FIG. 24 is a timing chart showing signal form at the supply of color image data to the color copying apparatus shown in FIG. 23.

The color conversion circuit 304 is composed of two look-up tables (LUT) 304-$a$, 304-$b$ capable of data setting from 0 to 255, and a 3×3 matrix calculation table 304-$c$. The LUT 304-$a$ is an exponential calculation table for correcting the characteristics, dependent on the input device, of the image data entered into the color conversion circuit. The 3×3 matrix calculation table 304-$c$ converts the data, corrected by the LUT 304-$a$, into image on the color space of the output equipment. The LUT 304-$b$ is an exponential calculation table for correcting the image data, subjected to color space conversion by the matrix calculation table 304-$c$, according to the characteristics of the output equipment. An example of combination of these tables is shown in FIG. 24.

In the present embodiment, the corrections of the input/output characteristics in the LUT's 304-$a$, 304-$b$ are achieved by preparing plural LUT's in advance according to the color spaces of the input/output equipment, i.e. according to the types of image and setting a suitable LUT according to the color space conversion, so that the number of LUT's can be limited.

Also, the color space conversion can be achieved exactly without depending on the input characteristics, as it is conducted by the 3×3 matrix conversion table on the data already corrected for the input characteristics.

Now there is considered a system in which the scanner/printer interface 223 is connected to an electrophotographic color copying apparatus 103 through a cable 107, and the interface 224 is connected to a similar color copying apparatus 104 through a cable 108.

In the following there will be explained the operation in case of printing an image, stored in the plain memories 311 of the interface device 101, by the color copying apparatus 103 based on a print command released from the host computer 102.

The CPU 203 receives the print command from the host computer 102 through the SCSI interface 205, then the CPU 209 interprets the received command and writes the content of the received command in a memory 222 under the control of a bus controller 211. Upon confirming the write-in, the CPU 209 reads the memory 222 and executes the print command. The CPU 209 provides the controller 303 of the interface 223 with an instruction to issue a print command to the color copying apparatus 103, and said controller 303 sends the print command thereto by communication through the cable 107. Cables 107, 108, 111, 112 have a same internal structure, and each cable can transmit 24-bit image data, a synchronization signal, a clock signal and a communication in both directions. Upon receiving the print command, the color copying apparatus 103 activates the printer and simultaneously sends back an image synchronization signal, in response to which the controller 303 releases an image request signal on a controller bus of a video bus 225 according to said synchronization signal and sends an image output request to the memory controller 301. According to said image request signal, the memory controller 301 releases 24-bit RGB image data to the video bus 225. The released image data are supplied to the color conversion circuit 304 in the interface 223, and then converted, in the plain memories 311, from the image data of a predetermined RGB color space into image data of MCY color space of the color copying apparatus 103. Then the masking color process circuit 305 effects image editing such as masking, UCR process etc. required for faithful image production matching the color reproduction characteristics of the color copying apparatus 103, and the converted C, M, Y, K (black) data are transferred to the color copying apparatus through the cable 107.

The color space is represented by the signal format for example of R, G, B signals or C, M, Y signals and predetermined reference values specific to each equipment.

The cable 107 transfers the image data in plane-sequential manner, in the order of M, C, Y and K, utilizing 8bits in 24-bit image data, in synchronization with the image development in the color copying apparatus. As a result, same RGB data are read four times from the frame memory 201 and are processed in the same manner.

The image data transfer in the present invention is not limited to the plane-sequential manner but can be made in any method adopted in the output equipment, such as dot-sequential manner.

Figure 23:
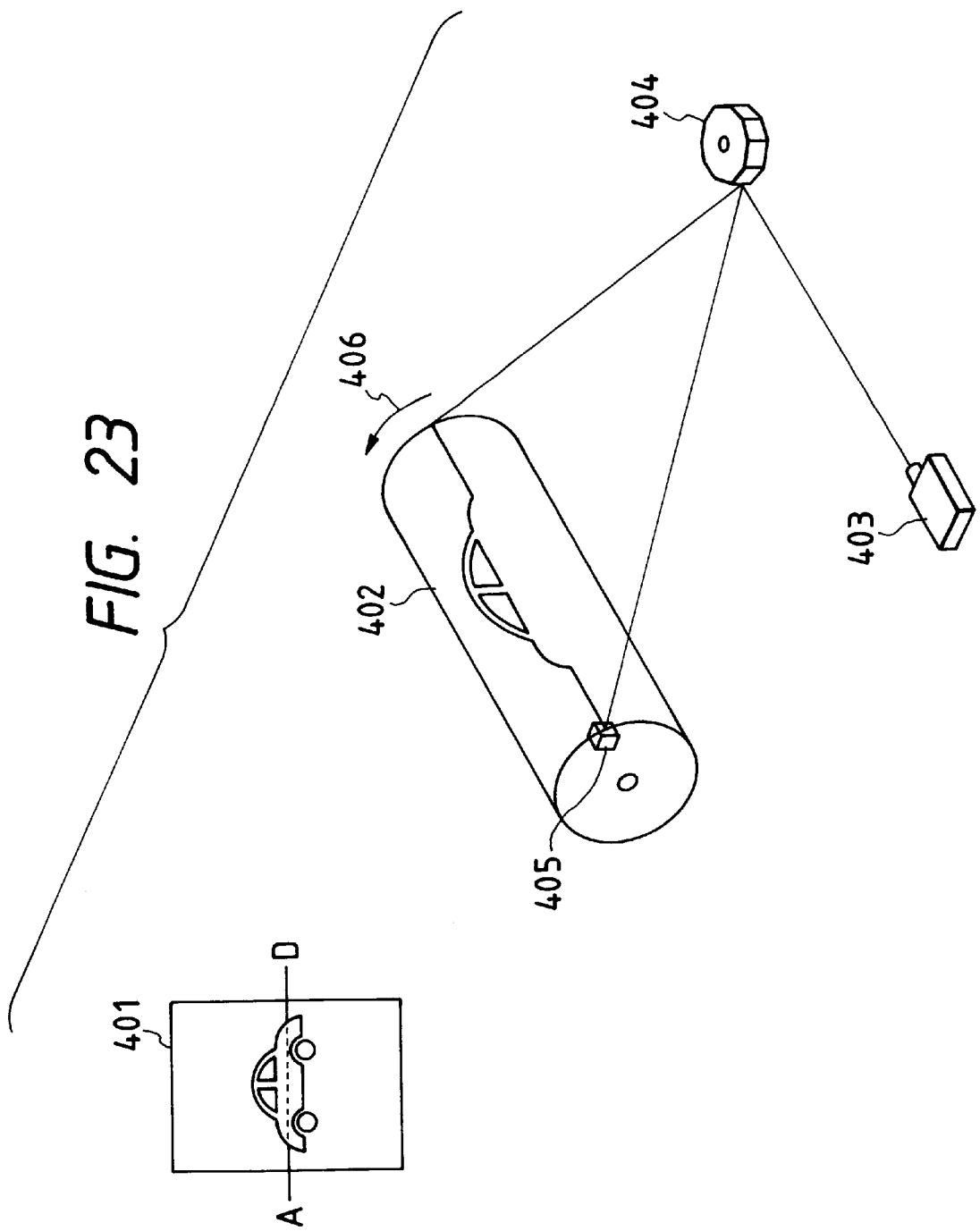
FIG. 23 is a schematic view showing a first example of the color copying apparatus.

FIG. 23 schematically shows the image formation from the image data received from the interface 223, in the electrophotographic color copying apparatus 103. 401 indicates image data stored in the frame memory, and there will be explained, as an example, formation of an electrostatic latent image corresponding to magenta color in a line section A-B, on a photosensitive drum 402. A laser unit 403 is turned on and off according to the transferred image data, and an electrostatic latent image is formed on a photosensitive drum 402 through a polygonal mirror 404. The photosensitive drum 402 is rotated in a direction 404. A beam sensor 405 detects the end of image to generate a horizontal synchronization signal HSYNC for synchronizing the image transfer, as shown in FIG. 24. The image formation is completed by repeating the above-explained operation four times for C, M, Y and K. In the above-explained operations, the log conversion circuit and the masking circuit are provided in the interface device 101, but it is also possible to utilize these circuits in the color copying apparatus. In such case the 24-bit image data line in the cable 107 is fully utilized for image data transfer.

In the following there will be explained an operation of storing image data, obtained from the color scanner of the color copying apparatus 103, into the frame memory 201.

The CPU 203 receives a scan command from the host computer 102 through the SCSI interface 205, and recognizes and executes said command. The CPU 209 sends a scan command by a communication process to the color copying apparatus 103 through the controller 303. In response, the color copying apparatus 103 transfers image data of the RGB color space, obtained by scanning an original and based on the input characteristics of the color copying apparatus 103, fully utilizing the 24-bit image data lines in the cable 107. In the interface device 101, the transferred RGB image data are supplied to the color conversion circuit 304 of the interface 223, then subjected to conversion of the color space according to the connected device and the registered file type, and released to the video bus 225. At the same time the controller 303 release a fetching request signal through the control bus to the memory controller 301, which fetches the image data on the video bus 225 and stores said data in the plane memories based on said request signal. The above-explained operations on the frame memory 201 are also conducted similarly on the frame memory 202, which is activated when the controller 303 similarly releases a request signal on the control bus for the memory controller 302. For avoiding the conflict of the controllers 303, 304 on the bus, the scanner/printer interfaces are so constructed as not to function simultaneously.

In the foregoing the image input/output operations of the color copying apparatus 103 have been explained, and the color copying apparatus 104 and the film scanners function in a similar manner.

FIG. 25 shows the signal configuration between the interface device and other devices such as the color copying apparatus (CLC) and the film scanner. The image signal is transmitted, as explained before, by 24-bit signal lines. The image control signal, for controlling the image data transfer, is composed of a pixel synchronization, a line synchronization signal and a page synchronization signal. The communication control signal effects instruction of operation and management of status by command/status serial communication. The sequence control signal is used for sending information on the power state of various units.

Figure 26:
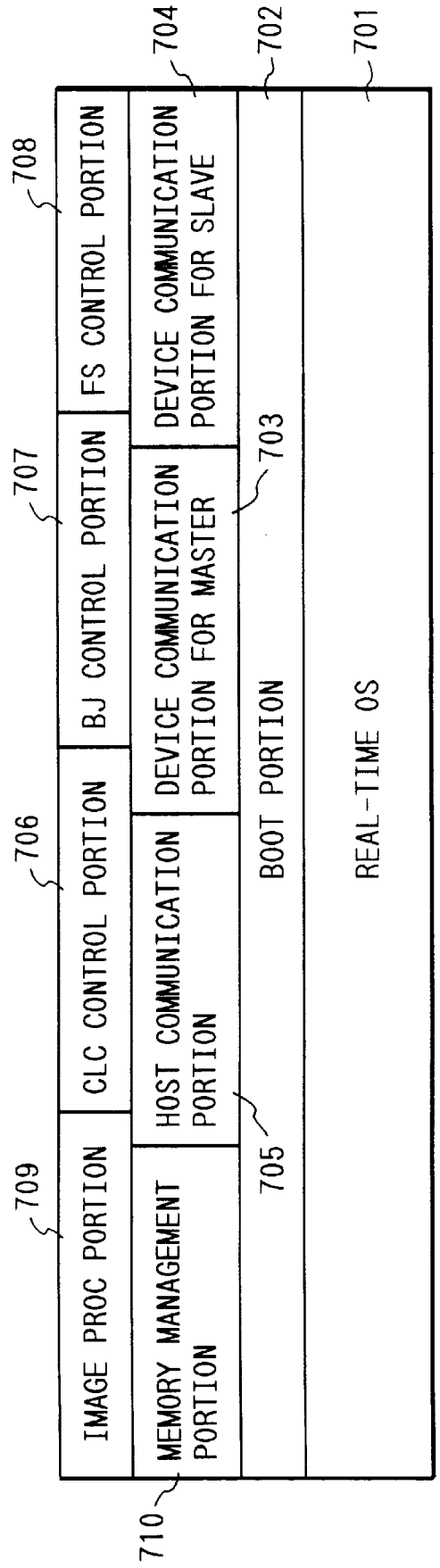
FIG. 26 is a view showing an example of modular structure of the control program of the CPU 208 in said embodiment.

FIG. 26 shows the modular structure of the control program, to be loaded in the program memory after the start of power supply and to be executed by the CPU 2. A module 701 is the real-time OS for managing plural tasks, which are activated on event-driven basis. A module 702 is a task to be executed at the start of the control program, and serves to initialization of various IC's and frame memories, initialization of the parameters and variables used in the control program and identification of the interface board. Modules 703, 704 control the command communication with the color copying apparatus or the film scanners. The module 703 executes a task of communication control in which the interface device becomes a master and releases a command, and the color copying apparatus becomes a slave and sends back a status. The module 704 effects an inverse task of communication control in which the color copying apparatus releases a command and the interface device return a status. A module 705 effects command communication and image transfer control with the CPU 1, whereby the CPU 2 analyzes the command received from the host computer through the SCSI controller and sends a starting instruction for the communication control task and the image processing task. Modules 706, 707, 708 are image input/output control tasks, for controlling the input/output of the image data respectively with the color copying apparatus of electrophotographic process, those of the ink jet process and the film scanners. A module 709 controls image processing, such as image compression, image expansion, image rotation, mirror image formation and color space conversion. A module 710 manages the image files to be registered in the frame memories 201, 202.

Figure 27:
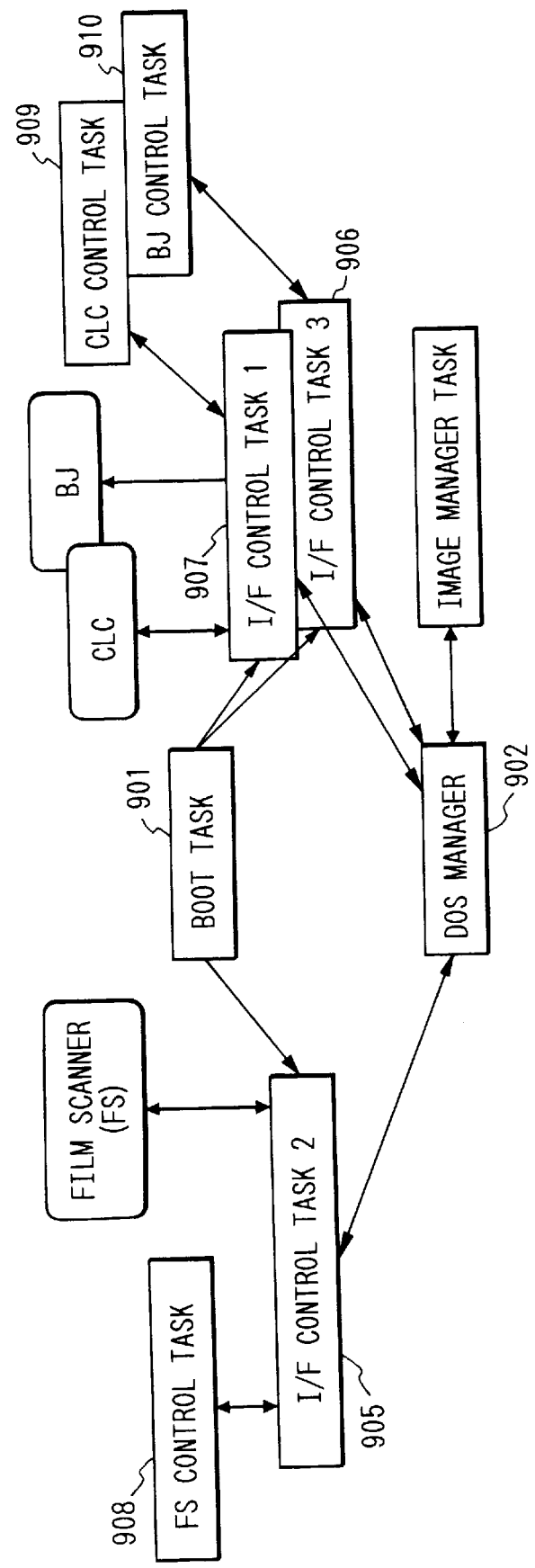
FIG. 27 is a view showing the software structure of said embodiment.

FIG. 27 shows the structure of the software system of the interface device, and the function of said system will be explained with reference to FIG. 27. After the start of power supply, the real-time OS of the module 701 is activated to generate tasks 901, 902. The task 901 controls a boot unit 702, and sets card codes, at the initialization, in a configuration table shown in FIG. 28A.

Said configuration table manages the boards set in the slots or namely in the scanner/printer interfaces 223, 224 and whether the output equipment and film scanners are connected in the slots.

Though not illustrated, each of the scanner/printer interfaces 223, 224 is provided with an inserted interface board which is provided with an identification hardware for board type identification, whereby the CPU 2 can read the identification and automatically recognize the board set in each slot. The board identification indicates the type of communication. Based on said recognition, engine card codes shown in FIG. 28B are written in the corresponding slots in the configuration table.

Then, the power ready state of the color copying apparatus and the film scanners, transmitted by the sequence control signals on the interface, is identified by signal detecting boards (not shown) on the boards 223, 224, and, if these units of equipment are activated, communication control tasks 905, 906, 907 are generated according to the engine card codes in the configuration table in FIG. 28A. The tasks 905 and 907 effect communication control of the module 703 in which the interface device becomes a master, while the task 906 effects communication control of the module 704 in which the interface device becomes a slave, whereby command/status exchange is achieved with the color copying apparatus and the film scanners. Based on the information obtained from this communication, the device codes and cassette information are set in device information tables shown in FIGS. 28A to 28E and 29.

Thus, the communication type is set by identifying the inserted interface board and managing the card codes respectively corresponding to the slots. Then communication is made with the connected device according to thus set communication type, and the device codes shown in FIGS. 28C and 28E are set, respectively corresponding to the slots, in the configuration tables shown in FIGS. 28A and 28D. Through these operations, the interface device 101 can automatically recognize the connected devices respectively corresponding to the slots.

As the above-explained recognition of the connected devices is conducted at each start of power supply, the latest state of the system can always be understood.

The task 902 controls the module 705 and analyzes the command received from the host computer. When a print/scan command is received, image input/output control tasks 908, 909, 910 are activated through communication control tasks 905, 906, 907. There is selected a slot in which an I/F card is mounted, according to a parameter contained in the print/scan command, and the image input/output control is conducted in specific manner to each device, according to the device code in the configuration table shown in FIG. 28A.

It is thus possible to switch the device to be used for scanning or printing, according to the purpose of the user. It is also possible to effect the image input/output tasks of different control processes, according to the connected equipment.

Figure 30:
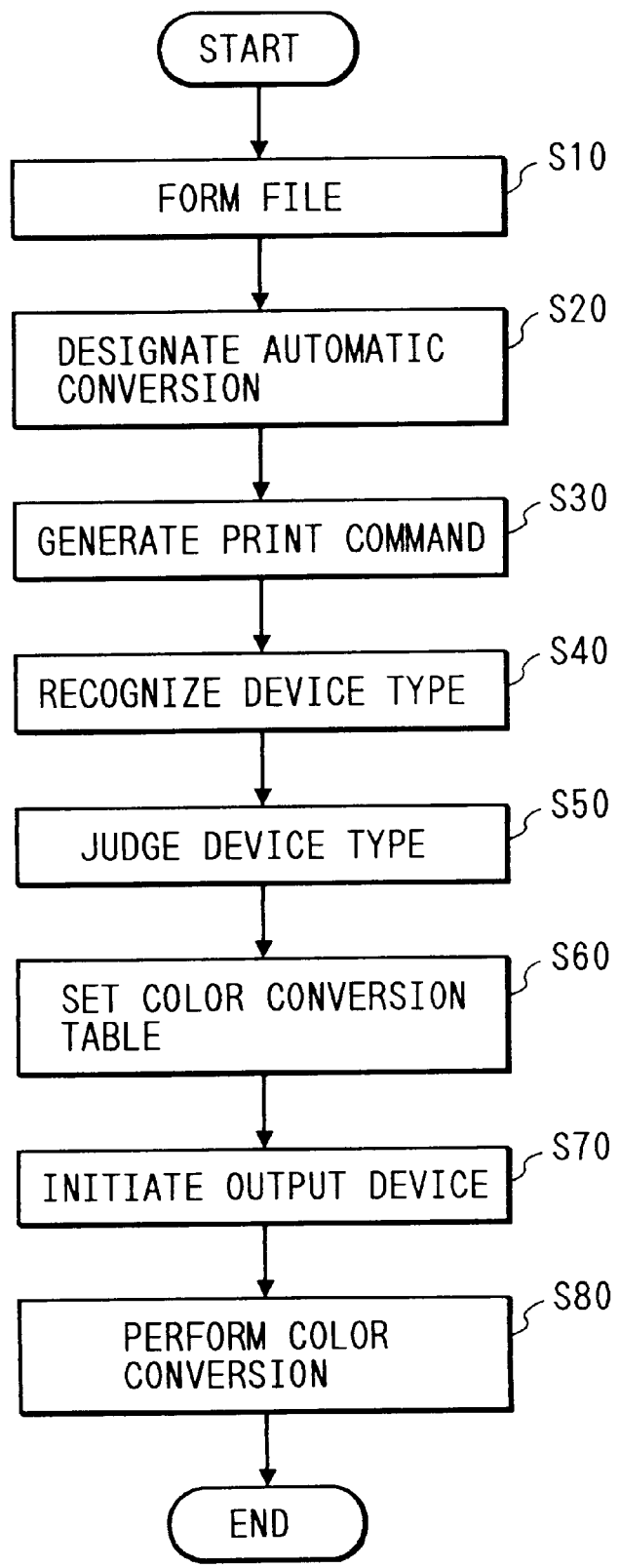
FIG. 30 is a flow chart of an example of color conversion process of said embodiment.

Now the setting procedure will be explained with reference to FIG. 30. A step S10 prepares an image file by designating, by a CREATE FILE command shown in FIG. 31, the image type or the color space of the image data storage in the frame memory 202, through a combination of IMAGE TYPE and IMAGE TYPE optional code. FIG. 35 is a list of correspondences between the image types and the combinations of IMAGE TYPE and IMAGE TYPE optical codes.

In this operation there is prepared a table shown in FIG. 32, as the file information, which is used for managing the image data stored in the frame memory 202 and contains various information such as the image type designated by the CREATE FILE command at the file preparation, and file ID.

A step S20 sets whether or not to conduct automatic conversation, for converting the image data of the interface device into the color space supported by the output device designated by the print command.

This step designates or not a Native Color Space Auto Conversion PAGE command shown in FIG. 33, and the automatic color space conversion is not executed if said designation is not made.

A step S30 releases a print command. It also releases a slot switching command at the same time, if the output equipment connected to the slot 0, i.e. the color copying apparatus 103 in the foregoing example of the system, is not used for printout.

A step S40 activates image input/output control tasks 908, 909 based on the print command released in the step S30, and recognized the connected device type according to the device code in the configuration table shown in FIG. 28A.

A step S50 identifies the type of the output device based on whether the slot switching slot has been issued in the step S30. The interface device is so set that the slot 0 becomes active s default. However, if the slot switching command has been issued, the slot 1 is rendered active to transmit the image data to the copying apparatus 104.

A step S60 sets the LUT's 304-a, 304-b in the color conversion circuit 304 and the 3×3 calculation table 304-c therein as shown in FIG. 34, so as to match the file information shown in FIG. 32, corresponding to the file storing the image data to be printed and the output device identified in the step S50 for image data printout.

A step S70 activates the connected devices through communication control tasks 905, 906, whereby the image data are subjected to real-time conversion in the color conversion in the transfer to the connected color copying apparatus.

As explained in the foregoing, the present embodiment can automatically achieve optimum color space conversion.

As explained in the foregoing, the second embodiment enables, in an image processing apparatus provided with plural output equipment, efficient output of the image data without mutual interference among such plural output equipment.

Also effective utilization of memory means is achieved through appropriate used of plural memory means according to the situation of use.

Also there is achieved efficient utilization of the memory area.

[Modification]

In the foregoing embodiments there are provided plural frame memories 201, 202 in advance, but the present invention is not limited to such embodiments. For example a frame memory may be divided by the CPU according to the required process.

Figure 37B:
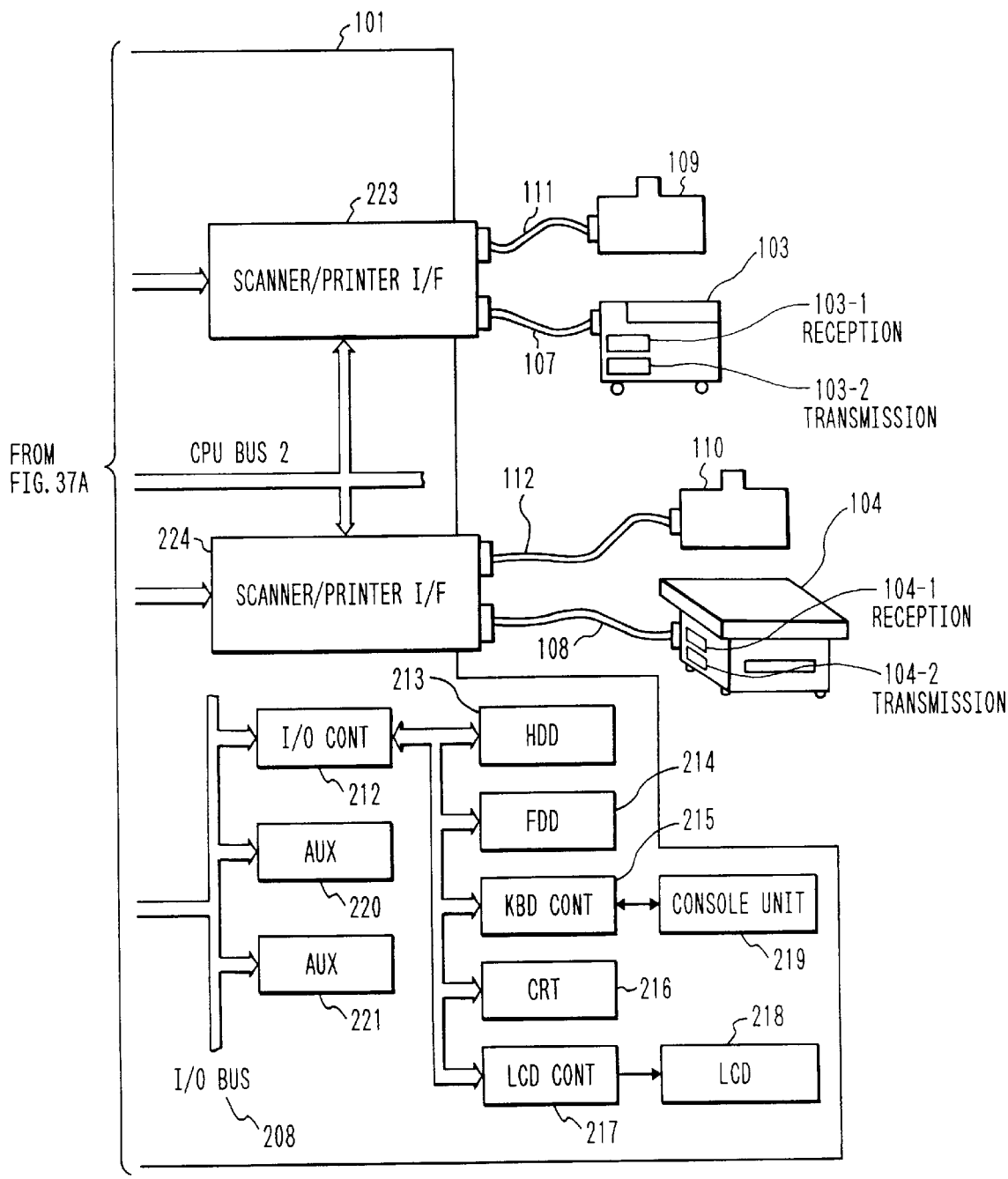
FIG. 37 comprised of FIGS. 37A and 37B is a block diagram showing a color image processing system constituting a second embodiment of the present invention.

In the following there will be explained a modification of the present invention, with reference to FIGS. 37A and 37B, wherein components same as those in the foregoing embodiments are represented by same symbols and will not be explained further.

In the present modification, the frame memory has a capacity for example of A3 size, which is divided into memory areas by the CPU 3 171 according to the required process, and said memory areas are controlled according to a selected mode.

More specifically a first mode effects double buffer transfer process for parallel input/output process of the image data. The CPU 3 171 divides and controls the frame memory of A3 size into two memories of A4 size each. This first mode enables high-speed process though other processes are inhibited.

A second mode controls a designated memory area exclusively for a process, in order to effect processing without mutual interference among the divided memory areas. This second mode is incapable of high-speed processing, but allows one to retain the data in other memory areas.

A third mode effects control without memory area division. Said third mode is incapable of high-speed processing, but allows to handle a large amount of image data, for example up to A3 size in the present embodiment.

The first and second modes are automatically selected by the CPU 3 171 according to whether single or plural output equipment are connected to the image processing apparatus.

The connected output equipment can be recognized by communication as in the foregoing second embodiment.

Also the third mode is automatically selected by the CPU 3 171, according to the amount of input image data.

Thus, this embodiment allows automatic selection of the appropriate modes by the CPU 3 171.

However, the mode selection may be made by the CPU 3 171 according to a command, as in the foregoing first embodiment.

The output equipment connected to the scanner/printer interface may be an output device provided with a recording head of the type for discharging liquid droplets by film boiling induced by thermal energy.

The present invention is not limited to the foregoing embodiments but is subject to various modifications within the scope and spirit of the appended claims.

What is claimed is:

1. An image processing apparatus capable of connecting to a plurality of output devices, comprising:

input means for inputting image data;

first and second memory means for storing the inputted image data:

setting means for setting modes concerning usage methods of said memory means according to a command inputted from an external apparatus, wherein the modes include:

a first mode, in which a read-out process and a read-in process are alternately performed on said first memory means and said second memory means; and a second mode, in which said first and second memory means are used respectively corresponding to different output devices of said plural connected output devices.

2. An apparatus according to claim 1, wherein said input means is connected to a host computer, and said host computer is said external apparatus.

3. An apparatus according to claim 2, wherein said input means receives a control command from the host computer, and said setting means sets the mode on the basis of the control command.

4. An apparatus according to claim 1, wherein said plural output devices are different in output processes.

5. An apparatus according to claim 1, wherein said setting means sets the first mode in a case where only one output device is connected to said apparatus and the second mode in a case where plural output devices are connected thereto.

6. An apparatus according to claim 5, further comprising recognition means for automatically recognizing the connected output device.

7. An apparatus according to claim 1, wherein said input means inputs memory control information, and said setting means sets the mode on the basis of the memory control information.

8. An image processing apparatus capable of connecting to a plurality of output devices, comprising:

input means for inputting color image data and control information from host equipment;

first and second memory means for storing the input color image data; and setting means for setting mode concerning usage method of said first and second memory means according to a command inputted from an external apparatus, wherein the modes include:

a first mode, in which said first and second memory means are controlled respectively, and a second mode, in which said first and second memory means are controlled as single memory means.

9. An apparatus according to claim 8, further comprising:

control means for controlling said first and second memory means, including means for switching, in the first mode, either an operation of parallel execution of data transfer between one of the divided memory means and a first external device and data transfer between the other of the divided memory means and a second external device, or an operation of parallel execution of data transfer between one of the divided memory means and a second external device and data transfer between the other of the divided memory means and the first external device.

10. An apparatus according to claim 8, further comprising:

plural output means for sending the image data, stored in said first and second memory means, to plural output devices.

11. An apparatus according to claim 8, wherein said plural output devices are different in output processes.

12. An image processing method of an image processing apparatus capable of connecting to plural output devices, said method comprising the steps of:

inputting storage data;

storing the inputted image data in first and second memory means;

setting modes concerning usage methods of the memory means according to a command inputted from an external apparatus, wherein the modes include:

a first mode, in which a read-out process and a read-in process are alternately performed on the first memory and the second memory; and a second mode, in which the first and second memory means are used respectively corresponding to different output devices from among the plural connected output devices.

13. An image processing method of an image processing apparatus capable of connecting to plural output devices, said method comprising the steps of:

inputting color image data and control information from host equipment, the control information relating to a memory usage method;

storing the inputted image data into first and second memory means;

setting mode concerning usage method of the first and second memory means according to a command inputted from an external apparatus, wherein the modes include:

a first mode, in which the first and second memory means are controlled respectively, and a second mode, in which the first and second memory means are controlled as a single memory means.

* * * * *

UNITED STATES PATENT AND TRADEMARK OFFICE
CERTIFICATE OF CORRECTION

PATENT NO. : 6,038,034

DATED : March 14, 2000

INVENTOR(S) : MASAHIRO NISHIO ET AL.

It is certified that error appears in the above-identified patent and that said Letters Patent is hereby corrected as shown below:

ON THE TITLE PAGE:

[56] References Cited, under U.S. PATENT DOCUMENTS

"Hosoghi" should read --Hosogai--.

Figure 19:
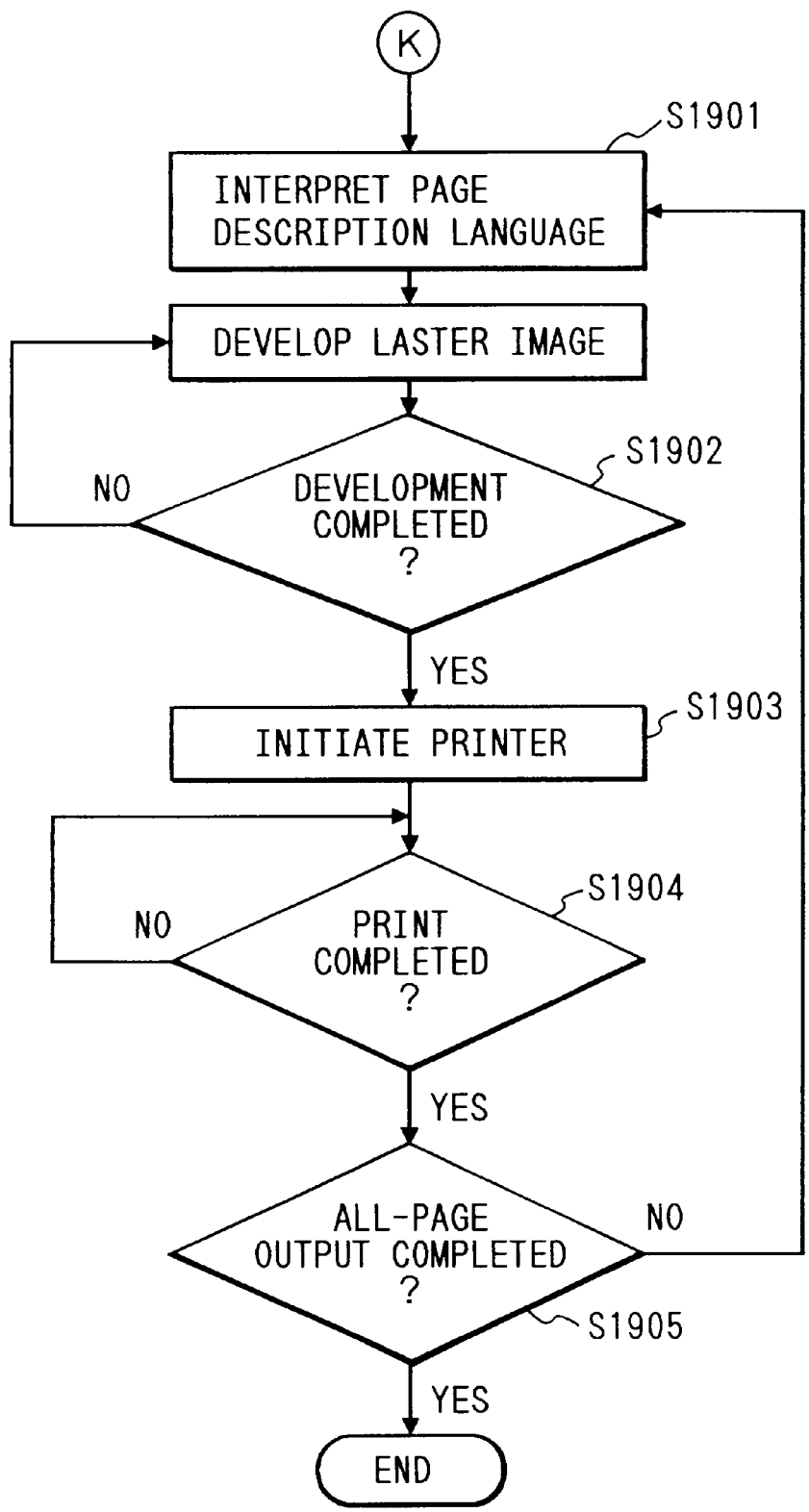
FIG. 19 is a flow chart of single buffer control in the PDL development.
Figure 20:
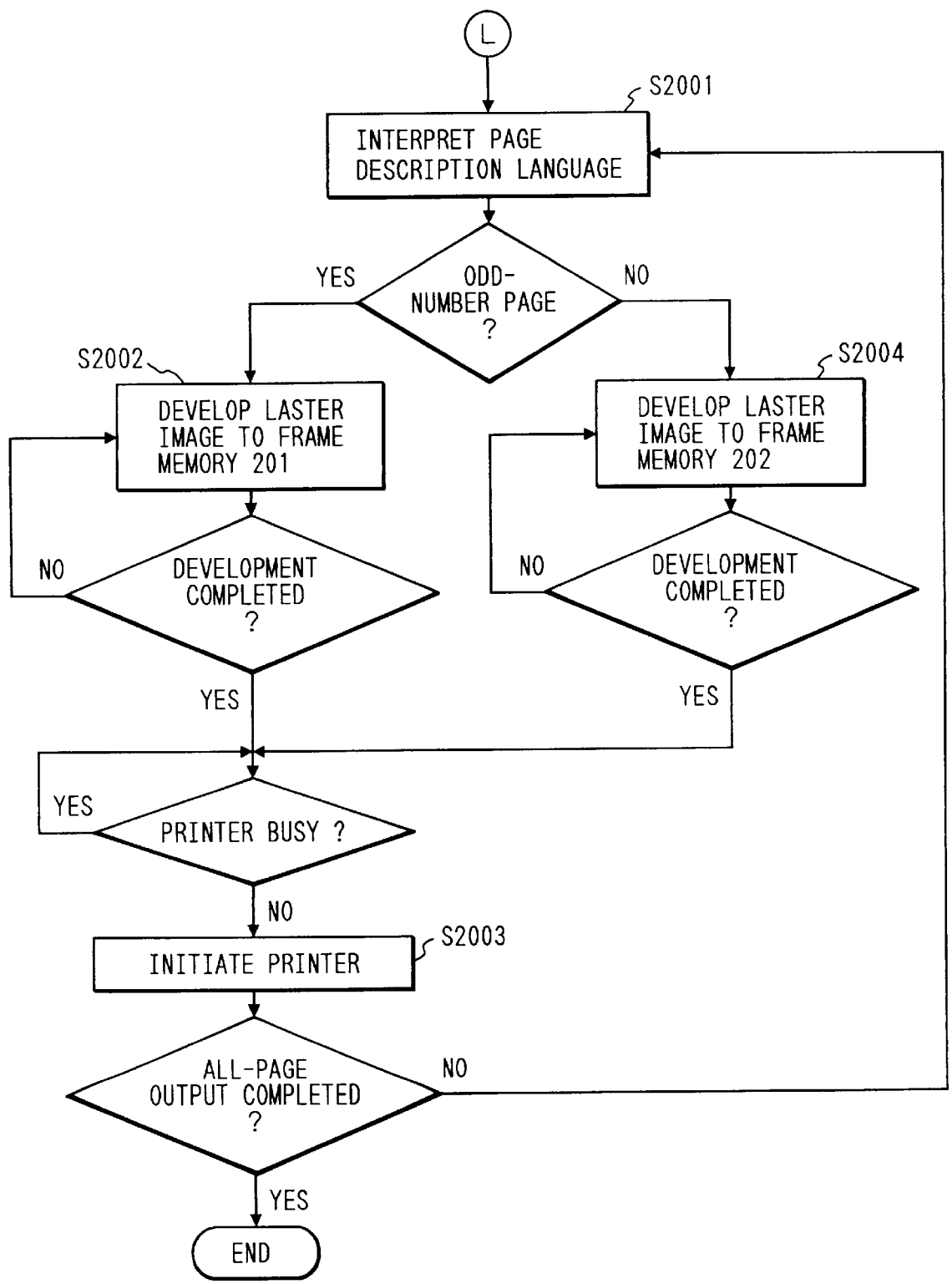
FIG. 20 is a flow chart of double buffer control in the PDL development.

IN THE DRAWINGS:

Sheet 18 of 37, FIG. 19, "LASTER" should read --RASTER--; and
    Sheet 19 of 37, FIG. 20, "LASTER" (both occurrences) should read --RASTER--;

COLUMN 1:

Line 40, "device" should read --devices--.

COLUMN 2:

Line 1, "of" should read --at--; and
    Line 28, "ever" should read --ever,--.

COLUMN 3:

Line 29, "means" should read --means as a--.

COLUMN 5:

Line 35, "connected" should read --connecting--.

UNITED STATES PATENT AND TRADEMARK OFFICE
CERTIFICATE OF CORRECTION

PATENT NO. : 6,038,034
DATED : March 14, 2000
INVENTOR(S) : MASAHIRO NISHIO ET AL.

It is certified that error appears in the above-identified patent and that said Letters Patent is hereby corrected as shown below:

COLUMN 6:

Line 10, "reflesh" should read --refresh--.

COLUMN 10:

Line 40, "A4image" should read --A4 image--;
    Line 49, "A4image" should read --A4 image--.

COLUMN 11:

Line 36, "the" should read --during--.

COLUMN 12:

Line 54, "utilizing" should read --utilize--.

COLUMN 14:

Line 4, "1st" should read --first--;
    Line 64, "1st" should read --first--; and
    Line 65, "a sam" should read --the same--.

COLUMN 15:

Line 2, "therefore." should read --therefor.--;
    Line 49, "hangle" should read --handle--; and
    Line 52, "1st" should read --first--.

UNITED STATES PATENT AND TRADEMARK OFFICE
CERTIFICATE OF CORRECTION

PATENT NO. : 6,038,034

DATED : March 14, 2000

INVENTOR(S) : MASAHIRO NISHIO ET AL.

It is certified that error appears in the above-identified patent and that said Letters Patent is hereby corrected as shown below:

COLUMN 16:

Line 9, "adjust" should read --adjusts--; and
    Line 47, "plain" should read --plane--.

COLUMN 17:

Line 9, "plain" should read --plane--; and
    Line 22, "8bits" should read --8 bits--.

COLUMN 18:

Line 3, "release" should read --releases--; and
    Line 34, "to" should read --to effect--.

COLUMN 19:

Line 2, "and" should read --and determines--; and
    Line 63, "optical" should read --optional--.

COLUMN 20:

Line 5, "conversation," should read --conversion,--;
    Line 18, "recognized" should read --recognizes--;
    Line 23, "active s" should read --active as a--;
    Line 43, "Also" should read --Also,--; and
    Line 46, "Also" should read --Also,--.

UNITED STATES PATENT AND TRADEMARK OFFICE
CERTIFICATE OF CORRECTION

PATENT NO.   : 6,038,034
DATED        : March 14, 2000
INVENTOR(S)  : MASAHIRO NISHIO ET AL.

It is certified that error appears in the above-identified patent and that said Letters Patent is hereby corrected as shown below:

<u>COLUMN 21</u>:

Line 10, "to" should read --one to--.

Signed and Sealed this

Twenty-fourth Day of April, 2001

Attest:

NICHOLAS P. GODICI

Attesting Officer

Acting Director of the United States Patent and Trademark Office